(12) United States Patent
Lee

(10) Patent No.: US 12,555,144 B2
(45) Date of Patent: Feb. 17, 2026

(54) METHOD, DEVICE, AND SYSTEM FOR EVALUATING PRODUCT REVIEW

(71) Applicant: Cafe24 Corp., Seoul (KR)

(72) Inventor: Jae Suk Lee, Seoul (KR)

(73) Assignee: Cafe24 Corp., Seoul (KR)

( * ) Notice: Subject to any disclaimer, the term of this patent is extended or adjusted under 35 U.S.C. 154(b) by 249 days.

(21) Appl. No.: 18/023,362

(22) PCT Filed: Jun. 24, 2021

(86) PCT No.: PCT/KR2021/007946
§ 371 (c)(1),
(2) Date: Feb. 26, 2023

(87) PCT Pub. No.: WO2022/045553
PCT Pub. Date: Mar. 3, 2022

(65) Prior Publication Data
US 2023/0334537 A1    Oct. 19, 2023

(30) Foreign Application Priority Data

Aug. 27, 2020  (KR) ................ 10-2020-0108860
Aug. 27, 2020  (KR) ................ 10-2020-0108864
(Continued)

(51) Int. Cl.
*G06Q 30/0282*    (2023.01)
(52) U.S. Cl.
CPC ................ *G06Q 30/0282* (2013.01)
(58) Field of Classification Search
CPC ............ G06Q 30/0282; G06Q 30/06
(Continued)

(56) References Cited

U.S. PATENT DOCUMENTS 7,428,496 B1 * 9/2008 Keller ............ G06Q 30/0201
705/7.32
7,433,832 B1 * 10/2008 Bezos ............ G06Q 10/10
705/26.8
(Continued)

FOREIGN PATENT DOCUMENTS

JP    09-185456 A    7/1999
JP    2005-158007 A    6/2005
(Continued)

OTHER PUBLICATIONS

European Search Report dated May 10, 2024 issued on Application No. 21861854.4.

*Primary Examiner* — Jonathan P Ouellette
(74) *Attorney, Agent, or Firm* — INVENSTONE PATENT, LLC

(57) ABSTRACT

Disclosed are a method, a device, and a system for evaluating a product review. The method for evaluating a product review may: display, by using a server, a search box, through which the product review can be searched, on a buyer terminal; input a keyword on the basis of the search box; extract at least one piece of product review information as a search result corresponding to the input keyword; display the extracted product review information on the buyer terminal; and when a purchase decision is made in a shopping mall introduced on the basis of the displayed product review information, input, from the buyer terminal, a review evaluation corresponding to the product review. Therefore, it is possible to associate the review evaluation of the product review with the product review.

18 Claims, 31 Drawing Sheets

(30) Foreign Application Priority Data

| Sep. 10, 2020 | (KR) | 10-2020-0116204 |
| Sep. 11, 2020 | (KR) | 10-2020-0116792 |
| Dec. 30, 2020 | (KR) | 10-2020-0187086 |

(58) Field of Classification Search
USPC .......................................... 705/1.1, 307, 345
See application file for complete search history.

(56) References Cited

U.S. PATENT DOCUMENTS

| 8,554,601 | B1* | 10/2013 | Marsh | G06Q 30/0278 |
| | | | | 705/7.32 |
| 8,738,390 | B1* | 5/2014 | Price | G06F 40/30 |
| | | | | 705/1.1 |
| 9,009,082 | B1* | 4/2015 | Marshall | G06Q 30/0601 |
| | | | | 705/26.1 |
| 9,576,304 | B2 | 2/2017 | Yamamoto | |
| 10,331,436 | B2* | 6/2019 | Deshpande | G06F 8/65 |
| 10,475,100 | B1* | 11/2019 | Herz | G06Q 30/0629 |
| 10,657,575 | B2* | 5/2020 | Prendki | G06Q 30/0621 |
| 2008/0235721 | A1* | 9/2008 | Ismail | G06Q 30/02 |
| | | | | 725/16 |
| 2008/0262906 | A1* | 10/2008 | Pamell | G07C 13/00 |
| | | | | 705/12 |
| 2013/0117329 | A1* | 5/2013 | Bank | G06F 16/954 |
| | | | | 707/E17.005 |
| 2013/0268457 | A1* | 10/2013 | Wang | G06Q 30/0203 |
| | | | | 705/347 |
| 2015/0254680 | A1* | 9/2015 | Scoles | G06F 16/951 |
| | | | | 705/7.29 |
| 2016/0035209 | A1 | 2/2016 | Martin et al. | |
| 2020/0019644 | A1* | 1/2020 | Mazouchi | H04L 67/535 |
| 2020/0302494 | A1* | 9/2020 | Banarji | G06F 16/9535 |
| 2020/0380495 | A1* | 12/2020 | Kang | G06Q 20/4097 |
| 2021/0192077 | A1* | 6/2021 | Barcellos | G06F 21/6254 |

FOREIGN PATENT DOCUMENTS

| JP | 2006-059256 A | 3/2006 |
| JP | 2009-259105 A | 11/2009 |
| JP | 2013-114647 A | 6/2013 |
| JP | 2019-95919 A | 6/2019 |
| JP | 2019153213 A | 9/2019 |
| KR | 10-2007-0060930 A | 6/2007 |
| KR | 10-2007-0091834 A | 9/2007 |
| KR | 10-2010-0131731 A | 12/2010 |
| KR | 10-1094619 B1 | 12/2011 |
| KR | 10-2016-0085143 A | 7/2016 |
| KR | 10-1719337 B1 | 3/2017 |
| KR | 10-2017-0128163 A | 11/2017 |
| KR | 10-2018-0000603 A | 1/2018 |
| KR | 10-2018-0077680 A | 7/2018 |
| KR | 10-2018-0115407 A | 10/2018 |
| KR | 10-2018-0132313 A | 12/2018 |
| KR | 10-2019-0001893 A1 | 1/2019 |
| KR | 10-2019-0048666 A | 5/2019 |
| KR | 10-2020-0030784 A | 3/2020 |
| KR | 10-2020-0038011 A | 4/2020 |
| KR | 10-2020-0089186 A | 7/2020 |
| KR | 10-2144900 B1 | 8/2020 |
| WO | 2011125793 A1 | 10/2011 |
| WO | 2017-094169 A1 | 6/2017 |

* cited by examiner

METHOD, DEVICE, AND SYSTEM FOR EVALUATING PRODUCT REVIEW

CROSS-REFERENCE TO RELATED APPLICATIONS

This application is a National Stage filing under 35 U.S.C. 371 of International Application No. PCT/KR2021/007946, filed on Jun. 24, 2021, which claims the benefit of earlier filing date and right of priority to Korean Application No. 10-2020-0108860 filed on Aug. 27, 2020, Korean Application No. 10-2020-0108864 filed on Aug. 27, 2020, Korean Application No. 10-2020-0116204 filed on Sep. 10, 2020, Korean Application No. 10-2020-0116792 filed on Sep. 11, 2020, and Korean Application No. 10-2020-0187086 filed on Dec. 30, 2020 in the Korean Intellectual Property Office, the contents of which are all hereby incorporated by reference herein in their entirety.

BACKGROUND OF THE DISCLOSURE

Technical Field

The present invention relates to a method, a device, and a system for evaluating a product review, and more particularly, to a method, a device, and a system for evaluating a product review capable of providing useful information for buyers to purchase products by evaluating product reviews of products sold in shopping malls to increase the reliability of product reviews.

Background Art

In recent years, the popularization of online communication such as the Internet has radically changed the commerce environment more than ever. Now, e-commerce online is so active that the word "Internet" or "online" feels like an unnecessary modifier to the extent that the word "online" or "internet shopping" itself is unfamiliar with nothing new. In addition, the trend of the online e-commerce market is expected to further expand.

As online e-commerce companies, in other words, shopping malls that sell products online, increase exponentially, shopping malls are striving to link data with various platforms to strengthen their image and expand their business. For example, a shopping mall implemented based on a specific platform wishes to link services of a different shopping mall implemented based on a different platform to its own shopping mall through linkage with a different platform.

As a success factor of such an online shopping mall, the provision of products of excellent quality is essential, and several other factors may be mentioned. For example, the success factors of an online shopping mall include various factors such as low prices compared to other shopping malls, fast delivery, friendly customer reception, a smooth access environment, and a user interface that is easy to use. However, recent online shopping mall infrastructure has been technically leveled upward, making it difficult to find differences among online shopping malls from traditional success factors.

Technological advances in IT have provided an infrastructure for opening online shopping malls that is relatively easy compared to the past, and as a result, barriers to entry into the online market are continuously lowering. As a result, non-experts in the field of shopping malls have entered the market en masse, and now the credibility of product sellers has become one of the most important factors in the success of online shopping malls.

Since the credibility of such sellers is formed by customers' feedback, collecting "customer opinions on products", for example, "reviews," has become an essential task to build the credibility of sellers.

However, a task of collecting customer opinions is not as easy as it looks. Customer opinions may usually be collected through product reviews or seller evaluations, such as review bulletin boards, but buyers find the process of taking product photos, visiting sites, and typing to write reviews quite cumbersome. This may be well understood by the fact that most sellers carry out various promotions to encourage review registration, but the results are insignificant.

In addition, reviews written by customers may help sales of products in shopping malls in another aspect, because reviews are an important indicator for a third party to make a purchase decision. Accordingly, there are many cases in which many customers refer to reviews more than content for product purchases. Nevertheless, it is true that it is practically difficult to guarantee the reliability of the review itself.

SUMMARY OF THE DISCLOSURE

The present invention is directed to addressing an issue associated with the related art, and to providing a method, a device, and a system for evaluating a product review capable of providing useful information for buyers to purchase products by evaluating product reviews of products sold in shopping malls to increase the reliability of product reviews.

An aspect of the present invention is directed to providing a method for evaluating a product review. The method for evaluating a product review may include: displaying, by using a server, a search box, through which the product review is able to be searched, on a buyer terminal; inputting a keyword on the basis of the search box; extracting at least one piece of product review information as a search result corresponding to the input keyword; displaying the extracted product review information on the buyer terminal; and when a purchase decision is made in a shopping mall introduced on the basis of the displayed product review information, inputting, from the buyer terminal, a review evaluation corresponding to the product review, wherein the displayed product review information includes the product review corresponding to a product, a Universal Resource Locator (URL) linkable to the product review and/or product purchase page, writer information of the product review, and the review evaluation of the product review.

The method for evaluating a product review may further include updating the review evaluation of the product review based on the review evaluation input from the buyer terminal; and storing the updated review evaluation in a database in association with the product review.

The review evaluation is a score, and when displayed on the buyer terminal, the review evaluation may be displayed in the form of at least one of grades, numbers, and star ratings. The extraction of the at least one piece of the product review information may include extracting a plurality of pieces of product review information from a plurality of different shopping malls.

The product review information extracted from the respective shopping malls may include at least one of: shopping mall identification information for identifying a shopping mall which sold a product corresponding to the product review information; order identification information corresponding to the product review information; product identification information for identifying a product corresponding to the product review information; a product review corresponding to the product review information; a URL linkable to the product review and/or product purchase page; a review evaluation corresponding to the product review information; and reviewer information corresponding to the product review information.

The reviewer information is a hash value based on a user name and user phone number, and may be uniquely identified even when the same reviewer uses different IDs in different shopping malls.

The product review information may further include a writer evaluation corresponding to writer information of the product review. The method for evaluating a product review may further include: updating the writer evaluation based on the review evaluation input from the buyer terminal; and storing the updated writer evaluation in a database in association with the writer information.

Another aspect of the present invention is directed to providing a device for evaluating a product review. The device for evaluating a product review may include: a search box display portion for displaying a search box, through which the product review is able to be searched, on a buyer terminal; a search processing portion for inputting a keyword on the basis of the search box, extracting at least one piece of product review information as a search result corresponding to the input keyword, and displaying the extracted product review information on the buyer terminal; and an evaluation processing portion for inputting, from the buyer terminal, a review evaluation corresponding to the product review when a purchase decision is made in a shopping mall introduced on the basis of the displayed product review information, wherein the displayed product review information includes the product review corresponding to a product, a Universal Resource Locator (URL) linkable to the product review and/or product purchase page, writer information of the product review, and the review evaluation of the product review.

The evaluation processing portion may update the review evaluation of the product review based on the review evaluation input from the buyer terminal, and store the updated review evaluation in a database in association with the product review.

The review evaluation is a score, and when displayed on the buyer terminal, it may be displayed in the form of at least one of grades, numbers, and star ratings. The search processing portion may extract a plurality of pieces of product review information from a plurality of different shopping malls.

The product review information extracted from the respective shopping malls may include at least one of: shopping mall identification information for identifying a shopping mall which sold a product corresponding to the product review information; order identification information corresponding to the product review information; product identification information for identifying a product corresponding to the product review information; a product review corresponding to the product review information; a URL linkable to the product review and/or product purchase page; a review evaluation corresponding to the product review information; and reviewer information corresponding to the product review information.

The reviewer information is a hash value based on a user name and user phone number, and may be uniquely identified even when the same reviewer uses different IDs in different shopping malls.

The product review information may further include a writer evaluation corresponding to the writer information of the product review. The evaluation processing portion may: update the writer evaluation based on the review evaluation input from the buyer terminal; and store the updated writer evaluation in a database in association with the writer information.

Yet another aspect of the present invention is directed to providing a system for evaluating a product review. The system for evaluating a product review may include: a buyer terminal; and a control server for displaying a search box, through which the product review is able to be searched, on the buyer terminal, inputting a keyword on the basis of the search box, extracting at least one piece of product review information as a search result corresponding to the input keyword, displaying the extracted product review information on the buyer terminal, and inputting, from the buyer terminal, a review evaluation corresponding to the product review when a purchase decision is made in a shopping mall introduced on the basis of the displayed product review information, wherein the displayed product review information includes the product review corresponding to a product, a Universal Resource Locator (URL) linkable to the product review and/or product purchase page, writer information of the product review, and the review evaluation of the product review.

The control server may update the review evaluation of the product review based on the review evaluation input from the buyer terminal, and store the updated review evaluation in a database in association with the product review.

The review evaluation is a score, and when displayed on the buyer terminal, it may be displayed in the form of at least one of grades, numbers, and star ratings. The control server may extract a plurality of pieces of product review information from a plurality of different shopping malls.

The product review information extracted from the respective shopping malls may include at least one of: shopping mall identification information for identifying a shopping mall which sold a product corresponding to the product review information; order identification information corresponding to the product review information; product identification information for identifying a product corresponding to the product review information; a product review corresponding to the product review information; a URL linkable to the product review and/or product purchase page; a review evaluation corresponding to the product review information; and reviewer information corresponding to the product review information.

The reviewer information is a hash value based on a user name and user phone number, and may be uniquely identified even when the same reviewer uses different IDs in different shopping malls.

The product review information may further include a writer evaluation corresponding to the writer information of the product review. The control server may: update the writer evaluation based on the review evaluation input from the buyer terminal; and store the updated writer evaluation in a database in association with the writer information.

Yet another aspect of the present invention is directed to providing a computer program stored on a medium to execute: displaying a search box, through which a product review is able to be searched, on a buyer terminal; inputting a keyword on the basis of the search box; extracting at least one piece of product review information as a search result corresponding to the input keyword; displaying the extracted product review information on the buyer terminal; and when a purchase decision is made in a shopping mall introduced on the basis of the displayed product review information, inputting, from the buyer terminal, a review evaluation corresponding to the product review, wherein the displayed product review information includes the product review corresponding to a product, a Universal Resource Locator (URL) linkable to the product review and/or product purchase page, writer information of the product review, and the review evaluation of the product review.

As described above, according to an embodiment of the present invention, by evaluating product reviews of products sold in a shopping mall, reliability of product reviews can be increased and useful information can be provided to buyers in purchasing products.

DESCRIPTION OF EXEMPLARY EMBODIMENTS

Figure 1:
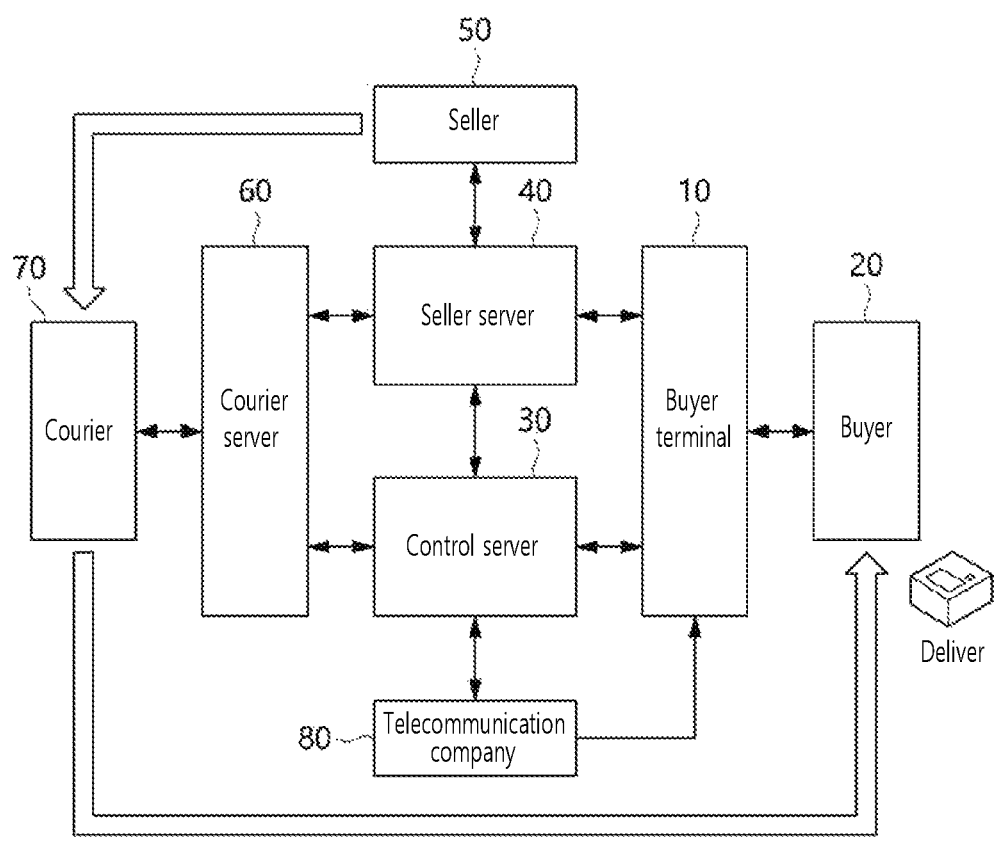
FIG. 1 is a block diagram illustrating a system configuration for realizing a product review registration method according to a first embodiment of the present invention.

The present invention may be variously modified and have various types, and specific embodiments of the present invention will be described below in detail with reference to the accompanying drawings. However, the present invention is not limited to the exemplary embodiments described herein, but all of the modifications, equivalents, and substitutions within the spirit and scope of the present invention are also included in the present invention.

Terms such as "first" and "second" may be used to describe various components, but the components are not restricted by the terms. The terms are used only to distinguish one component from another component. For example, a first component may be named a second component without departing from the scope of the right of the present invention. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

The terms used in the present specification are merely used to describe specific embodiments and are not intended to limit the present invention. A singular expression includes a plural expression, unless the context clearly states otherwise. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless otherwise defined, all terms including technical and scientific terms used herein have the same meaning as commonly understood by those skilled in the technical field to which the present invention pertains. It will be understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In describing the present invention, in order to facilitate the overall understanding, the same reference numerals are used to designate the same components throughout the drawings, and repeated descriptions of the same components will be omitted.

FIG. 1 is a block diagram illustrating a system configuration for realizing a product review registration method according to a first embodiment of the present invention.

As illustrated in FIG. 1, a buyer terminal 10 may interwork with a seller server 40. The seller server 40 may be a server provided in a shopping mall that operates an online shopping mall. The online shopping mall may be a web-based internet shopping mall, a home shopping mall, a social networking service (SNS) shopping mall, or the like. The seller server may be implemented based on at least one server level computer device.

A buyer 20 may purchase a product by accessing an online shopping mall using the buyer terminal 10 or a computer device (PC, or the like) authenticated with a buyer account and ordering a desired product. The seller server 40 of the seller 50 may perform order processing and the like in an online shopping mall. The buyer terminal 10 may be a mobile device of the buyer 20, such as a cellular phone, a laptop computer, and a tablet PC. The buyer terminal 10 may be a network device equipped with a memory, a processor, an information input/output unit, an auxiliary storage device, a camera, a microphone, a speaker, a short range wireless communication module, and the like, and capable of accessing a wide area communication network such as the Internet.

The buyer terminal 10 may interwork with a control server 30. The control server 30 may perform overall control, server-side calculation, and data storage necessary for a method of automatically registering a product review according to preferred embodiments of the present invention. The control server 30 may interwork with the buyer terminal 10, the seller server 40, a courier server 60, and a telecommunication company 80. This control server 30 may be implemented based on at least one server level computer device.

Figure 2:
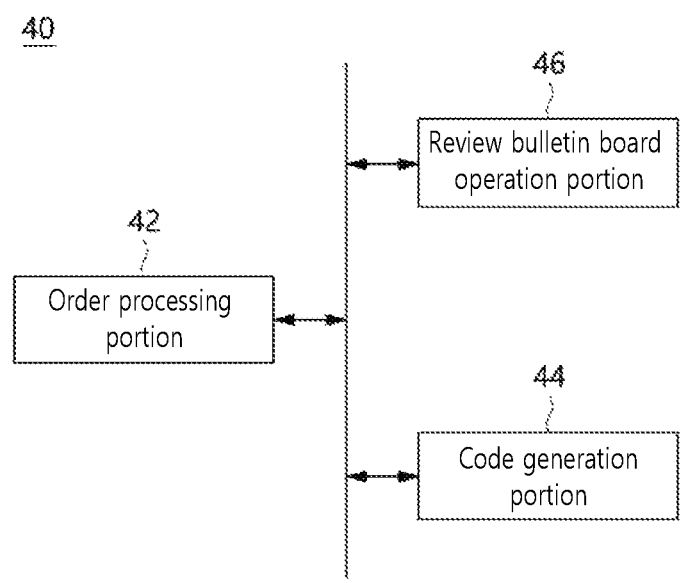
FIG. 2 is a block diagram illustrating the configuration of a seller server illustrated in FIG. 1.

FIG. 2 is a block diagram illustrating the configuration of the seller server 40 illustrated in FIG. 1.

As illustrated in FIG. 2, the seller server 40 according to a first embodiment of the present invention may include an order processing portion 42, a code generation portion 44, and a review bulletin board operation portion 46. Each of the portions 42 to 46 may interwork with each other or one another.

The order processing portion 42 may receive an order request for ordering a product from the buyer terminal 10 in an online shopping mall and perform payment and delivery according to the order request. For example, the order request may include identification information of the buyer terminal 10 and order identification information for identifying the order.

In response to the order request, the code generation portion 44 may generate an encrypted code including identification information of the buyer terminal 10, the order identification information, and the Universal Resource Locator (URL) of a review bulletin board for uploading a purchase review of a product. The review bulletin board operation portion 46 may operate a review bulletin board. The review bulletin board may be accessed based on the URL.

The encrypted code may be attached to a product package corresponding to the product and conveyed to the courier 70. When the product package is conveyed to the buyer 20 through the courier 70, the buyer terminal 10 may recognize the encrypted code, verify an actual buyer based on the order identification information and the identification information of the buyer terminal 10, and then automatically connect the buyer terminal 10 to the review bulletin board using the URL of the review bulletin board.

Figure 3:
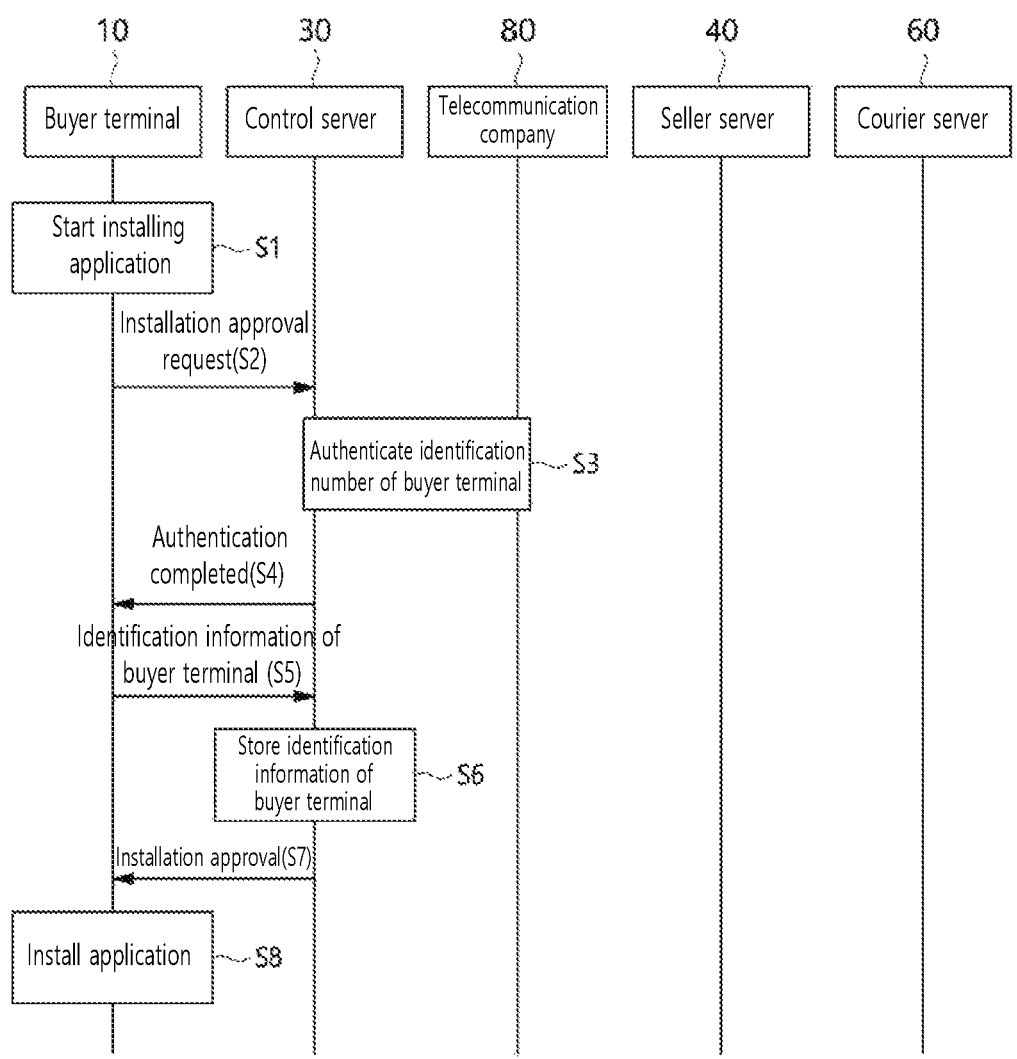
FIG. 3 is a flowchart illustrating a process of authenticating a buyer terminal and installing an application.

FIG. 3 is a flowchart illustrating a process of authenticating the buyer terminal 10 and installing an application.

As illustrated in FIG. 3, the buyer terminal 10 starts installing an application (stage: S1). Herein, the application may be a computer program stored in a medium for executing the method of automatically registering a product review according to preferred embodiments of the present invention by the buyer terminal 10. In order to install such an application, terminal authentication needs to be performed to verify whether the buyer terminal 10 is a terminal normally registered to the buyer 20.

To this end, the buyer terminal 10 may transmit an installation approval request to the control server 30 (stage: S2). The installation approval request may include an identification number of the buyer terminal 10. The identification number of the buyer terminal 10 may be, for example, a phone number of the buyer terminal 10. Upon receiving the installation approval request, the control server 30 may authenticate the identification number of the buyer terminal 10 in association with a telecommunication company (stage: S3).

When there is no abnormality as a result of the authentication, an installation authentication reply indicating that the buyer terminal 10 has been normally authenticated may be transmitted to the buyer terminal 10 (stage: S4).

Subsequently, the buyer terminal 10 may transmit the identification number of the buyer terminal 10 to the control server 30 (stage: S5). Then, the control server 30 may store the identification number of the buyer terminal 10 in a database (stage: S6) and transmit an installation approval to the buyer terminal 10 (stage: S7). Then, the buyer terminal 10 may respond to the installation approval and install the application in the buyer terminal 10 (stage: S8). The installation file of the application may be delivered to the buyer terminal 10 by the control server 30 or delivered to the buyer terminal 10 through an application store such as Google Store.

Figure 4:
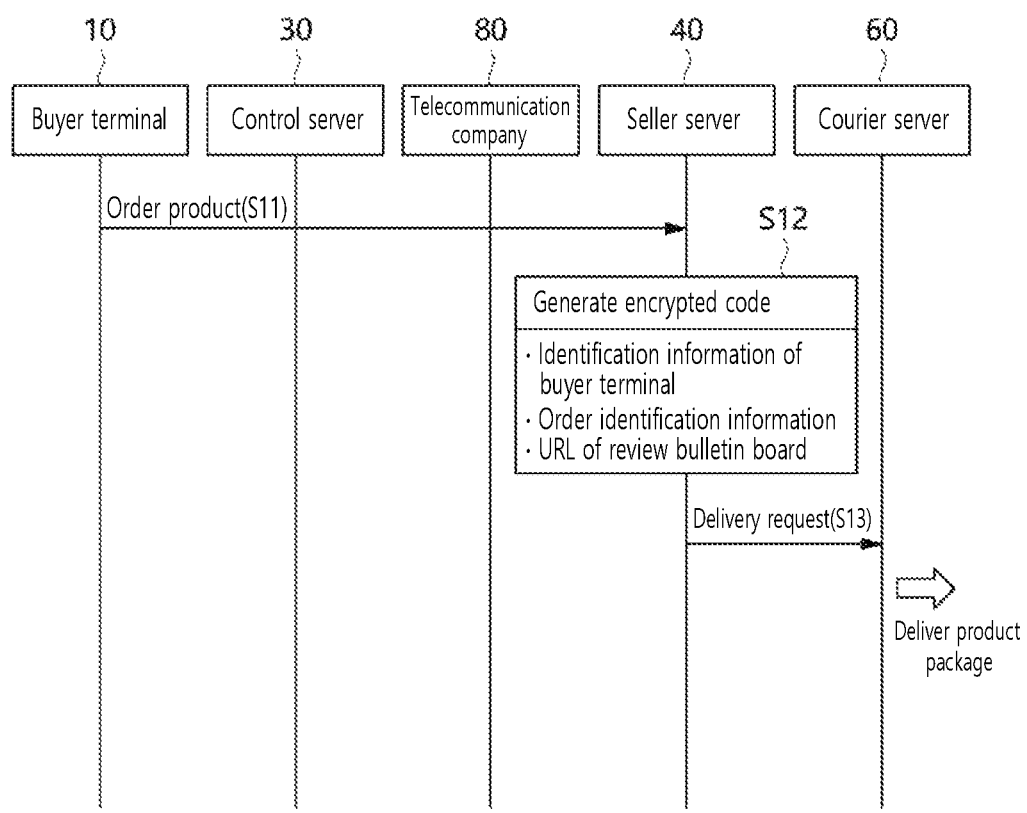
FIG. 4 is a flowchart illustrating the flow until the delivery of a product package according to a first preferred embodiment of the present invention.

FIG. 4 is a flowchart illustrating the flow until the delivery of a product package according to a first preferred embodiment of the present invention.

A buyer 20 may purchase a product by accessing an online shopping mall using the buyer terminal 10 or a computer device authenticated with a buyer account and ordering a desired product. An order request generated when a product is ordered may be transferred to the seller server 40.

As illustrated in FIG. 4, the buyer terminal 10 may transmit an order request for a product to the seller server 40 (stage: S11). The order request may include identification information of the buyer terminal 10 and order identification information for identifying the order. The identification information of the buyer terminal 10 may be, for example, a phone number corresponding to the buyer terminal 10.

In response to the order request, the seller server 40 may generate an encrypted code including the identification information of the buyer terminal 10, the order identification information, and the URL of a review bulletin board for uploading a purchase review of the product (stage: S12). The review bulletin board may be operated by the review bulletin board operation portion 46.

The seller server 40 may transmit the order identification information and the identification information of the buyer terminal 10 to the control server 30, and the control server 30 may store the transmitted order identification information and identification information of the buyer terminal 10 in a database.

The encrypted code may be a Quick Response (QR) code, a barcode, or a three-dimensional code. In this first embodiment, it is assumed that the encrypted code is mainly a QR code in the following descriptions.

The encrypted code may be attached to a product package corresponding to the product. For example, the encrypted code may be attached to the product, attached to a wrapping paper or packaging box for packaging the product, or attached to the inside or outside of a delivery box of the product.

In addition, a light response module, for example, a light response chip, may be attached to a product package. The light response module may transmit a control signal when light greater than or equal to a threshold value is sensed. The control signal may execute a code recognition module of the buyer terminal 10.

This light response module may be attached to a position that satisfies the condition of transmitting a control signal by receiving light greater than or equal to a threshold value when a product package is opened while receiving light less than the threshold value in the finished state of the product package. For example, the light response module may be attached to wrapping paper or a packaging box for packaging the product, or attached to the inside of a delivery box of the product.

Figure 5:
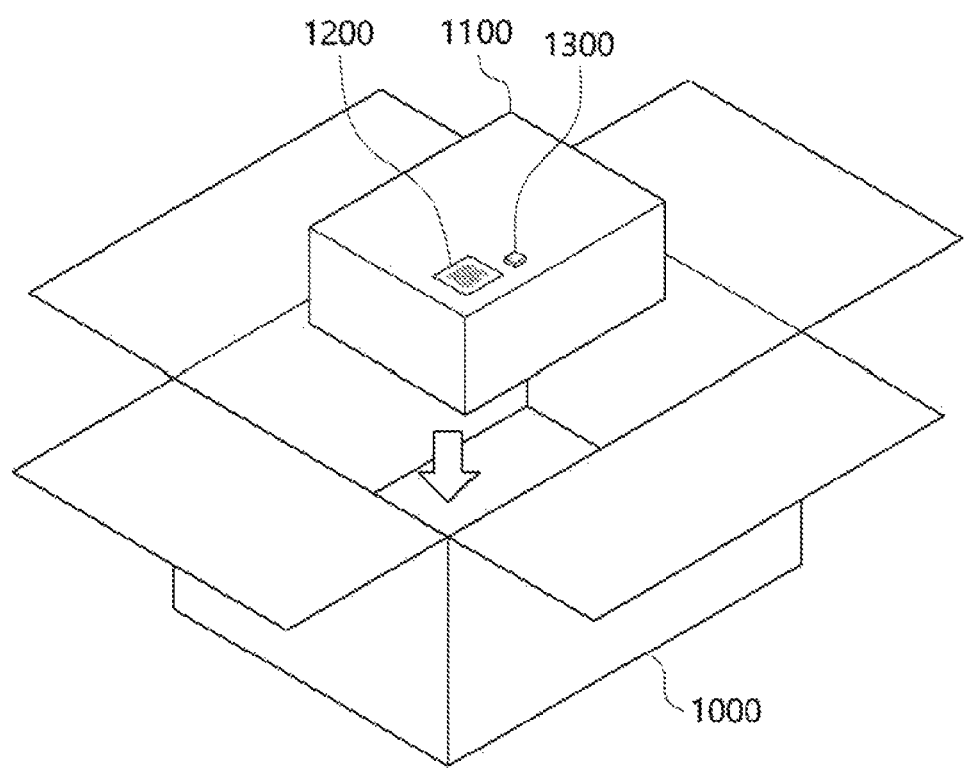
FIG. 5 is an exemplary diagram exemplarily illustrating packaging by attaching an encrypted code to a product package according to the first preferred embodiment of the present invention.

FIG. 5 is an exemplary diagram exemplarily illustrating packaging by attaching an encrypted code to a product package according to the first preferred embodiment of the present invention.

As illustrated in FIG. 5, an encrypted code 1200 may be attached to one side of a packaging box 1100 of a product. In addition, a light response module 1300, for example, a light response chip, may be attached to the other side of the packaging box 1100. The light response module 1300 may transmit a control signal when light greater than or equal to a threshold value is sensed. The control signal may execute a code recognition module of the buyer terminal 10.

As such, in the example illustrated in FIG. 5, the packaging box 1100 of a product to which the encrypted code 1200 and the light response module 1300 are attached is packaged by a delivery box 1000 complete a product package.

The seller server 40 may transmit a delivery request to the courier server 60 (S13). Then, the courier 70 may collect the product package and deliver the same to the buyer 20. The buyer 20 may receive the product package delivered by the courier 70.

Figure 6:
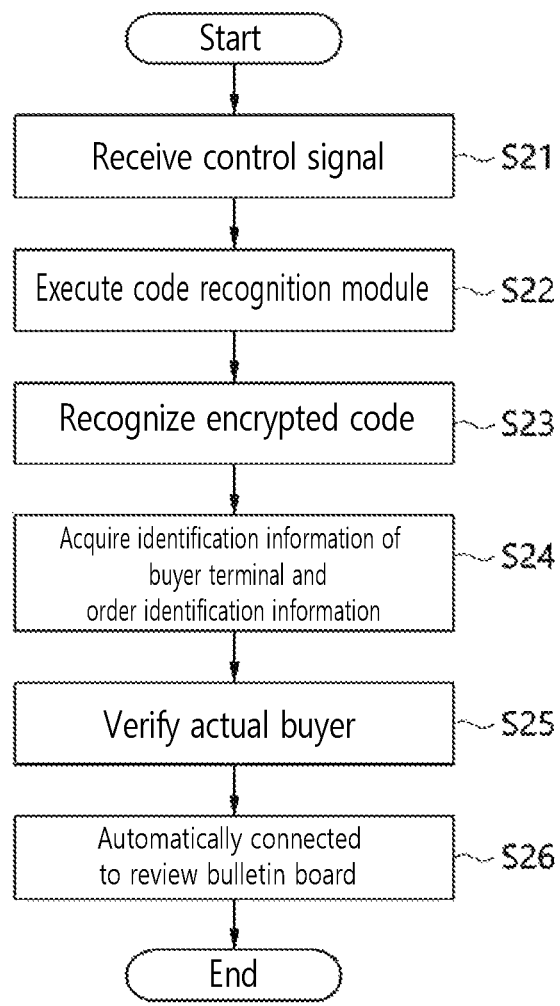
FIG. 6 is a flowchart illustrating a process of automatically registering a product review after a buyer receives a product package according to the first preferred embodiment of the present invention.

FIG. 6 is a flowchart illustrating a process of automatically registering a product review after the buyer 20 receives a product package according to the first preferred embodiment of the present invention.

As illustrated in FIG. 6, the buyer 20 receiving a product package may open the product package to take out a product. When the product package is opened, an internally attached light response module may sense light greater than or equal to a threshold value and send a control signal. Then, the buyer terminal 10 receives the control signal (stage: S21). The buyer terminal 10 receiving the control signal may execute a code recognition module (stage: S22). According to another embodiment of the present invention, when the light response module is not attached, a user may directly execute the code recognition module.

Figure 7:
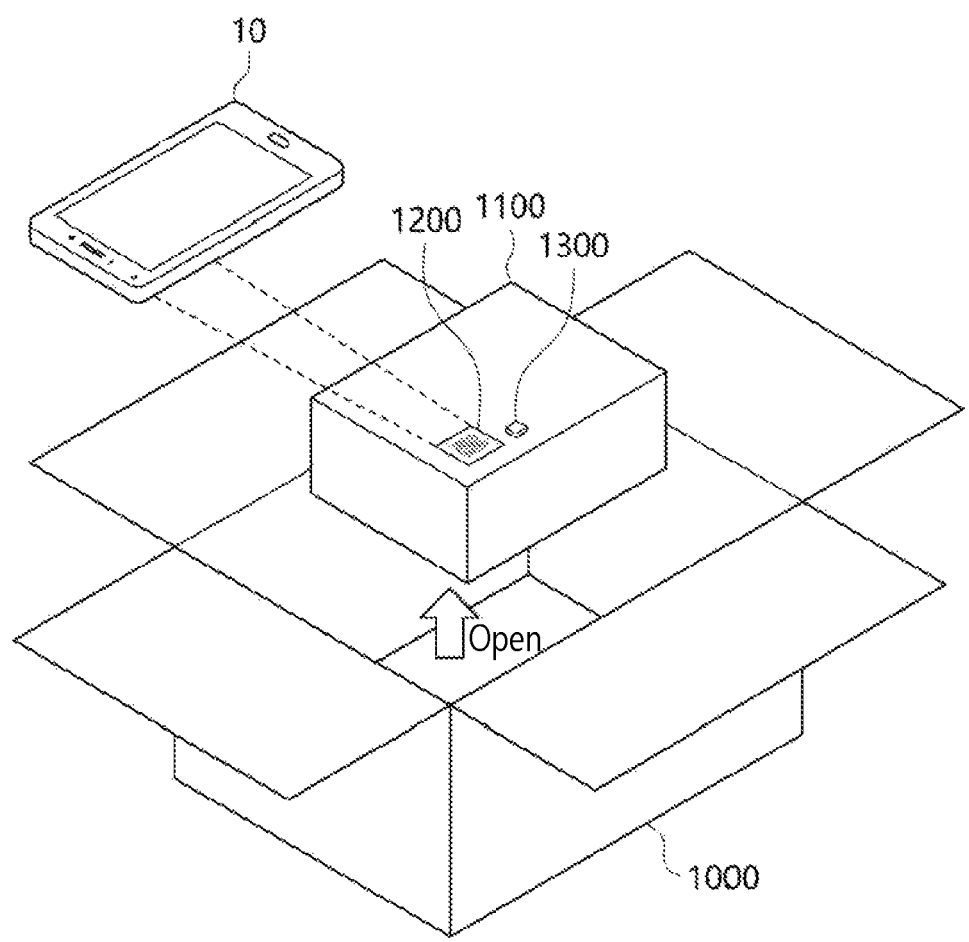
FIG. 7 is an exemplary diagram exemplarily illustrating acquisition of an encrypted code attached to a product package to a buyer terminal.

Next, the buyer terminal 10 may recognize the encrypted code attached to the product package based on a code recognition module (stage: S23). FIG. 7 is an exemplary diagram exemplarily illustrating acquisition of an encrypted code attached to a product package to the buyer terminal 10. As illustrated in FIG. 7, the buyer terminal 10 may recognize the encrypted code 1200 attached to the packaging box 1100 using the code recognition module activated according to the control signal of the light response module 1300 when the packaging box 1100 in which a product is packaged from the delivery box 1000 is taken out.

The buyer terminal 10 may acquire the identification information of the buyer terminal 10, the order identification information, and a review bulletin board URL by decrypting the recognized encrypted code (stage: S24). The buyer terminal 10 may perform actual buyer verification using the acquired order identification information and identification information of the buyer terminal 10 (stage: S25).

For example, the buyer terminal 10 may transmit an actual buyer authentication request including the acquired order identification information and identification information of the buyer terminal 10 to the control server 30. The control server 30 may verify an actual buyer based on linking with the telecommunication company 80 in response to the actual buyer authentication request. For example, the control server 30 may verify the actual buyer by comparing the order identification information and identification information of the buyer terminal 10 transmitted from the buyer terminal 10 with the order identification information and identification information of the buyer terminal 10 stored in the database.

When the verification is completed, the control server 30 may transmit a result of confirming the actual buyer to the buyer terminal 10. For example, when it is confirmed that the buyer terminal 10 corresponding to the buyer 20 is an actual buyer, the control server 30 may transmit a confirmation result indicating the actual buyer to the buyer terminal 10, and in response thereto, the buyer terminal 10 may be automatically connected to the review bulletin board based on a review bulletin board URL (stage: S26). When it is confirmed that the buyer terminal 10 is not an actual buyer, an error message may be generated and a message indicating retry may be displayed.

As described above, according to the first preferred embodiment of the present invention, by using an encrypted barcode attached to a product package to verify an actual buyer and automatically connect the same to a review bulletin board, a buyer can easily upload product review(s) and a seller can easily collect reliable product reviews.

Figure 8:
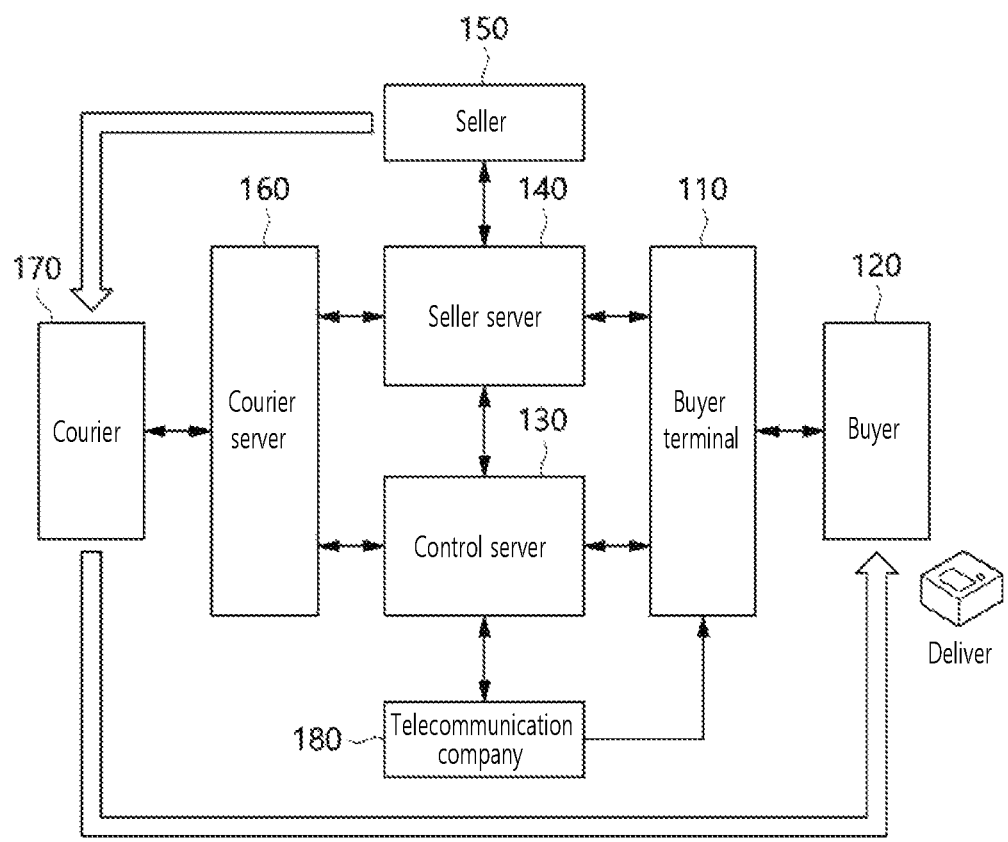
FIG. 8 is a block diagram illustrating a system configuration for realizing a product review registration method according to a second embodiment of the present invention.

FIG. 8 is a block diagram illustrating a system configuration for realizing a product review registration method according to a second embodiment of the present invention.

As illustrated in FIG. 8, a buyer terminal 110 may interwork with a seller server 140. The seller server 140 of a seller 150 may be a server provided in a shopping mall that operates an online shopping mall. The online shopping mall may be a web-based internet shopping mall, a home shopping mall, a social networking service (SNS) shopping mall, or the like. The seller server 140 may be implemented based on at least one server level computer device.

A buyer 120 may purchase a product by accessing an online shopping mall using the buyer terminal 110 or a computer device (PC, or the like) authenticated with a buyer account and ordering a desired product. The seller server 140 may perform order processing and the like in an online shopping mall. The buyer terminal 110 may be a mobile device of a buyer, such as a cellular phone, a laptop computer, and a tablet PC. The buyer terminal 110 may be a network device equipped with a memory, a processor, an information input/output unit, an auxiliary storage device, a camera, a microphone, a speaker, a short range wireless communication module, and the like, and capable of accessing a wide area communication network such as the Internet.

The buyer terminal 110 may interwork with a control server 130. The control server 130 may perform overall control, server-side calculation and data storage necessary for a method of automatically registering a product review according to preferred embodiments of the present invention. The control server 130 may interwork with the buyer terminal 110, the seller server 140, a courier server 160, and a telecommunication company 180. This control server 130 may be implemented based on at least one server level computer device.

Figure 9:
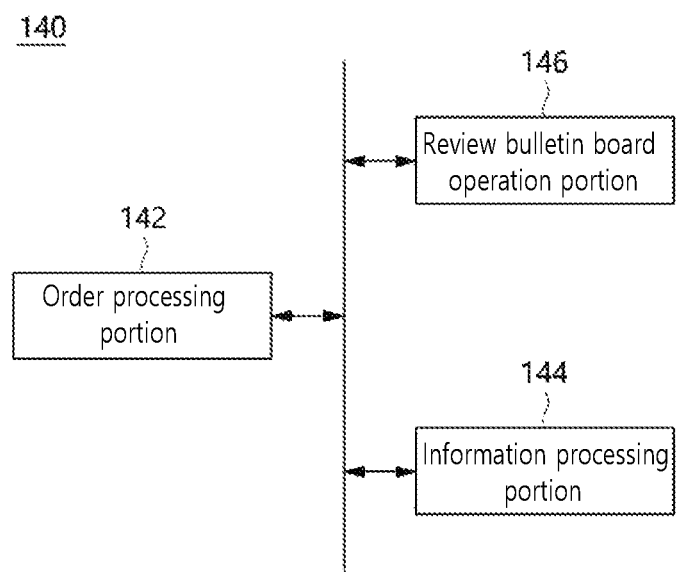
FIG. 9 is a block diagram illustrating the configuration of the seller server illustrated in FIG. 8.

FIG. 9 is a block diagram illustrating the configuration of the seller server 140 illustrated in FIG. 8.

As illustrated in FIG. 9, the seller server 140 according to a second embodiment of the present invention may include an order processing portion 142, an information processing portion 144, and a review bulletin board operation portion 146. Each of the portions 142 to 146 may interwork with each other or one another.

The order processing portion 142 may receive an order request for ordering a product from the buyer terminal 110 in an online shopping mall and perform payment and delivery according to the order request. For example, the order request may include identification information of the buyer terminal 110 and order identification information for identifying the order. The review bulletin board operation portion 146 may operate a review bulletin board. The review bulletin board may be accessed based on the URL.

In response to an order request, the information processing portion 144 may generate a hash including the identification information of the buyer terminal 110, the order identification information, and the URL of a review bulletin board for uploading a purchase review of a product, convert the generated hash into a sound source file for playing a sound wave, and store the converted sound source file in a light response module. The light response module in the second preferred embodiment of the present invention may be a chip that plays the sound wave when a light greater than or equal to a threshold value is sensed.

The light response module may be included in a product package corresponding to the product and transferred to the buyer 120. When the buyer 120 opens the product package, the light response chip plays a sound wave, and the buyer terminal 110 acquires the sound wave and verifies an actual buyer based on the order identification information and identification information of the buyer terminal 110. Then, the buyer terminal 110 may be automatically connected to the review bulletin board by using the URL of the review bulletin board.

First, also in the second preferred embodiment of the present invention, the installation process of the application described above with reference to FIG. 3 is performed in the same way. In the process, the buyer terminal 110 is authenticated and the identification number of the buyer terminal 110 is stored in the database of the control server 130. The installation file of the application may be delivered to the buyer terminal 110 by the control server 130 or delivered to the buyer terminal 110 through an application store such as Google Store.

Figure 10:
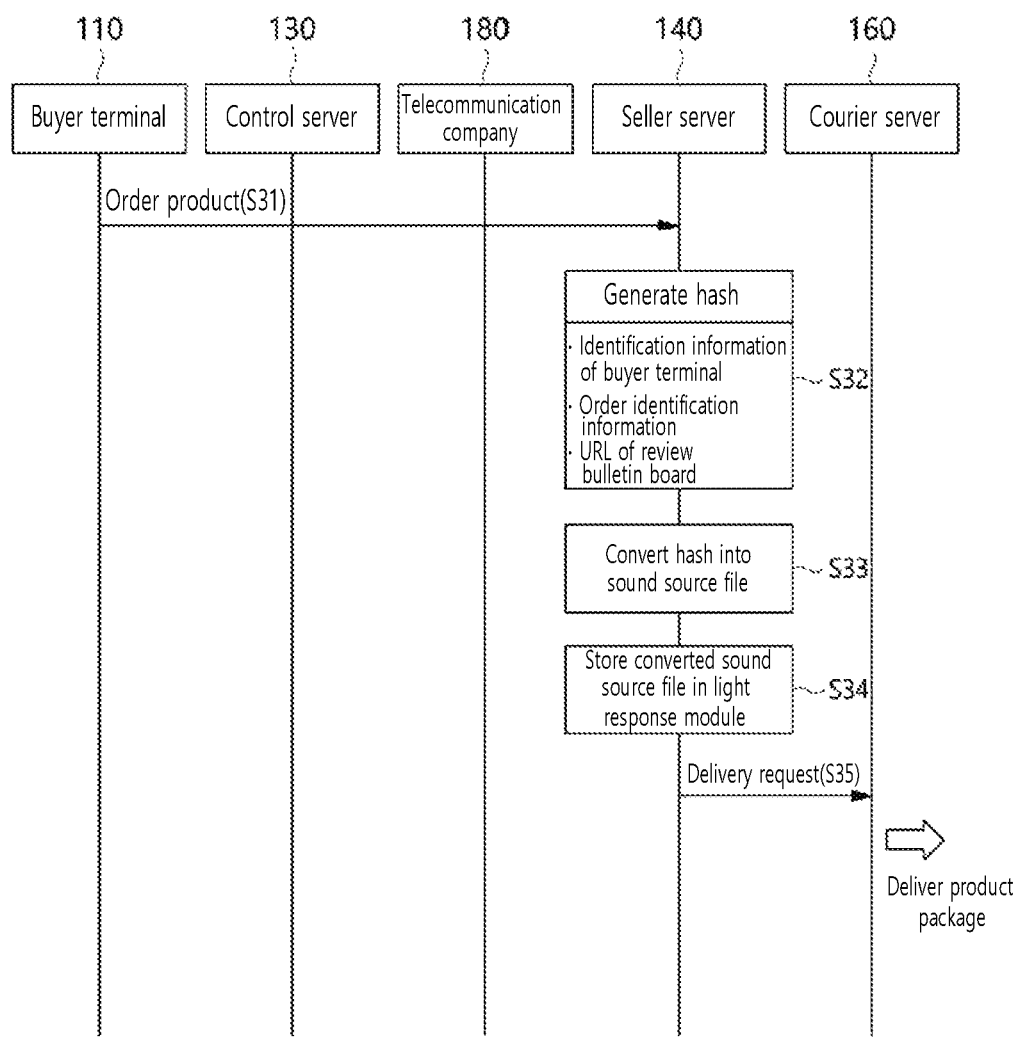
FIG. 10 is a flowchart illustrating the flow up to delivery of a product package according to a second preferred embodiment of the present invention.

FIG. 10 is a flowchart illustrating the flow up to delivery of a product package according to a second preferred embodiment of the present invention.

The buyer 120 may purchase a product by accessing an online shopping mall using the buyer terminal 110 or a computer device authenticated with a buyer account and ordering a desired product. An order request generated when a product is ordered may be transferred to the seller server 140.

As illustrated in FIG. 10, the buyer terminal 110 may transmit an order request for a product to the seller server 140 (stage: S31). The order request may include identification information of the buyer terminal 110 and order identification information for identifying the order. The identification information of the buyer terminal 110 may be, for example, a phone number corresponding to the buyer terminal 110.

In response to the order request, the seller server 140 may generate a hash including the identification information of the buyer terminal 110, the order identification information, and the URL of a review bulletin board for uploading a purchase review of a product (stage: S32). The review bulletin board may be operated by the review bulletin board operation portion 146.

The seller server 140 may transmit the order identification information and the identification information of the buyer terminal 110 to the control server 130, and the control server 130 may store the transmitted order identification information and identification information of the buyer terminal 110 in a database.

The seller server 140 may convert the generated hash into a sound source file for playing a sound wave (stage: S33) and store the converted sound source file in a light response module (stage: S34). As mentioned above, the light response module may play the stored sound wave when light greater than or equal to a threshold value is sensed. The sound source file may be a sound source file outputting an audible sound wave or a sound source file outputting an inaudible sound wave. For example, the sound source file may be MIDI, MP3, or the like.

The light response module may be included in a product package corresponding to the product. For example, the light response module may be attached to a position that satisfies the condition of transmitting a control signal by receiving light greater than or equal to a threshold value when a product package is opened while receiving light less than the threshold value in the finished state of the product package. For example, the light response module may be attached to the product, a wrapping paper or a packaging box for packaging the product, or the inside of a delivery box of the product.

Figure 11:
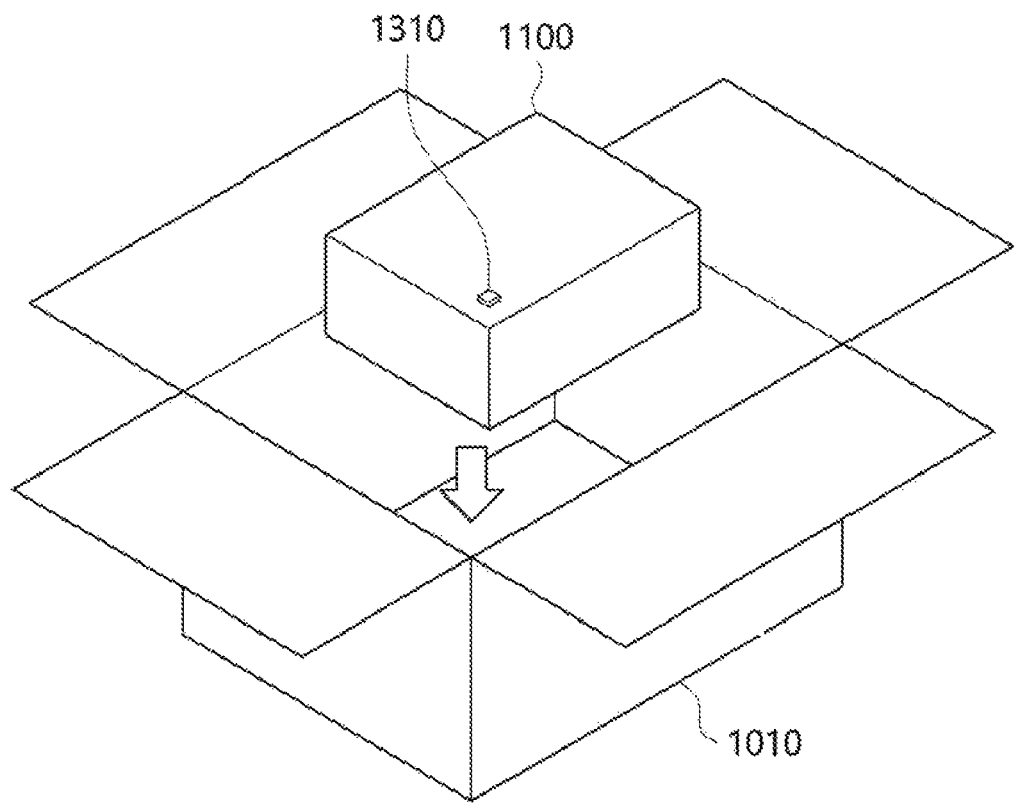
FIG. 11 is an exemplary diagram exemplarily illustrating packaging by attaching a light response module to a product package according to the second preferred embodiment of the present invention.

FIG. 11 is an exemplary diagram exemplarily illustrating packaging by attaching a light response module to a product package according to the second preferred embodiment of the present invention.

As illustrated in FIG. 11, a light response module 1310 may be attached to one side of a product packaging box 1110. The light response module 1310 may play a sound wave when light greater than or equal to a threshold value is sensed.

In addition, the light response module 1310 may transmit a control signal before playing a sound wave. The control signal may cause the buyer terminal 110 to automatically execute a sound wave acquisition module for acquiring a sound wave. The control signal may be a short range wireless communication signal or a sound wave. When the control signal is a sound wave, the sound wave played by the light response module 1310 may include a control signal for activating the sound wave acquisition module.

As such, in the example illustrated in FIG. 11, the packaging box 1110 of the product to which the light response module 1310 is attached is packaged by a delivery box 1010 to complete a product package.

The seller server 140 may transmit a delivery request to a courier server 160 (S35). Then, the courier 170 may collect the product package and deliver the same to the buyer 120. The buyer 120 may receive the product package delivered by the courier 170.

Figure 12:
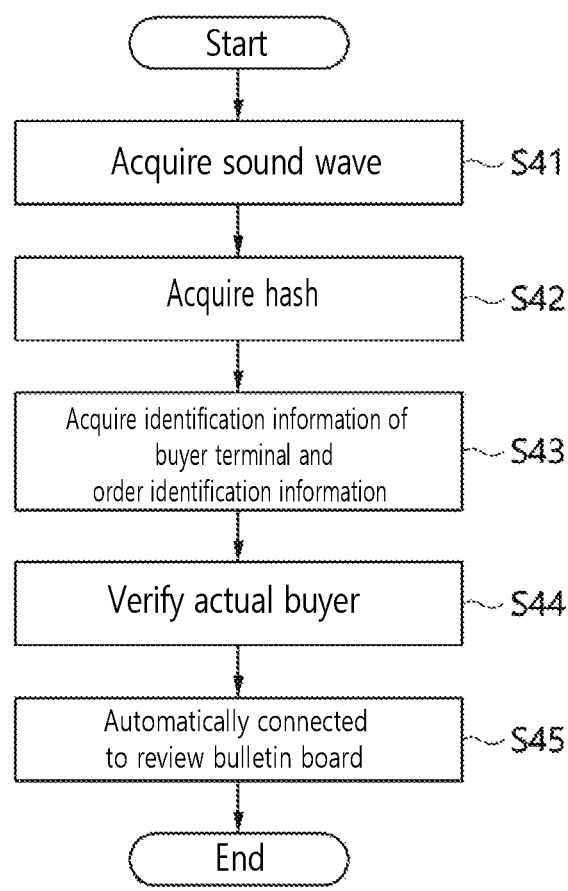
FIG. 12 is a flowchart illustrating a process of automatically registering a product review after a buyer receives a product package according to the second preferred embodiment of the present invention.

FIG. 12 is a flowchart illustrating a process of automatically registering a product review after the buyer 120 receives a product package according to the second preferred embodiment of the present invention.

First, the buyer 120 receiving a product package may open the product package to take out a product. When the product package is opened, an internally attached light response module may sense light greater than or equal to a threshold value and send a control signal. The control signal may be a short range wireless communication signal or a sound wave. The sound wave acquisition module may be activated in response to the control signal.

Figure 13:
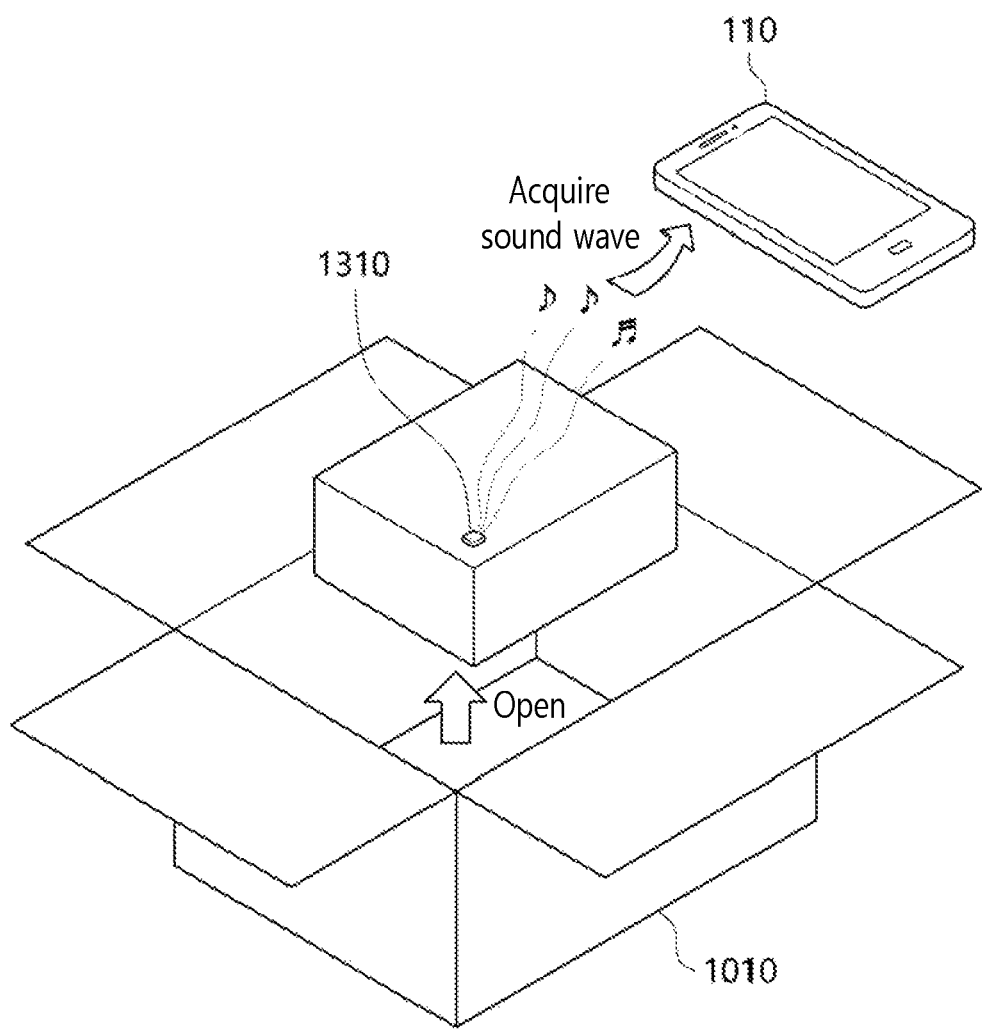
FIG. 13 is an exemplary diagram exemplarily illustrating acquisition of sound waves output from a light response module attached to a product package to a buyer terminal.

As illustrated in FIG. 12, when the light response module plays the sound wave when the buyer 120 opens a product package, the buyer terminal 110 may acquire the sound wave (stage: S41). FIG. 13 is an exemplary diagram exemplarily illustrating acquisition of sound waves output from the light response module attached to a product package to the buyer terminal 110. As illustrated in FIG. 13, the buyer terminal 110 may take out a packaging box in which a product is packaged from the delivery box 1010 and acquire the sound wave played from the light response module 1310. The sound wave may be an acoustically beautiful sound, such as a song or music, or a sound in an inaudible region that humans cannot hear.

After acquiring a hash from the acquired sound wave (stage: S42), the buyer terminal 110 may acquire identification information of the buyer terminal 110, order identification information, and a review bulletin board URL by decoding the acquired hash (stage: S43). The buyer terminal 110 may perform actual buyer verification using the acquired order identification information and identification information of the buyer terminal 110 (stage: S44).

For example, the buyer terminal 110 may transmit an actual buyer authentication request including the acquired order identification information and identification information of the buyer terminal 110 to the control server 130. The control server 130 may verify an actual buyer in response to the actual buyer authentication request. For example, the control server 130 may verify the actual buyer by comparing the order identification information and identification information of the buyer terminal 110 transmitted from the buyer terminal 110 with the order identification information and identification information of the buyer terminal 110 stored in the database.

When the verification is completed, the control server 130 may transmit a result of confirming the actual buyer to the buyer terminal 110. For example, when it is confirmed that the buyer terminal 110 corresponding to the buyer is an actual buyer, the control server 130 may transmit a confirmation result indicating the actual buyer to the buyer terminal 110, and in response thereto, the buyer terminal 110 may be automatically connected to the review bulletin board based on a review bulletin board URL (stage: S45). When it is confirmed that the buyer terminal 110 is not an actual buyer, an error message may be generated and a message indicating retry may be displayed.

As described above, according to the second preferred embodiment of the present invention, sound waves are output using the light response module attached to a product package to verify an actual buyer and automatically connect the same to a review bulletin board, so that the buyer 120 can easily upload product review(s) and the seller 150 can easily collect reliable product review(s).

Figure 14:
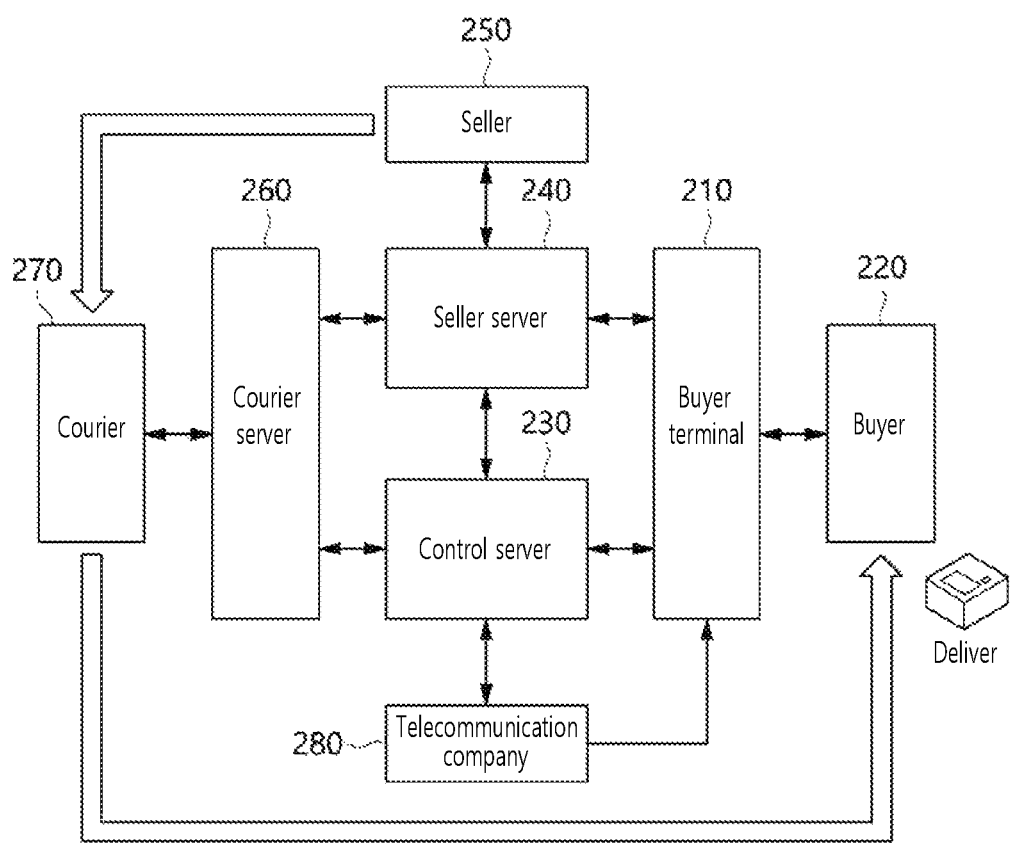
FIG. 14 is a block diagram illustrating a system configuration for realizing a product review registration method according to a third embodiment of the present invention.

FIG. 14 is a block diagram illustrating a system configuration for realizing a product review registration method according to a third embodiment of the present invention.

As illustrated in FIG. 14, a buyer terminal 210 may interwork with a seller server 240. The seller server 240 of a seller 250 may be a server provided in a shopping mall that operates an online shopping mall. The online shopping mall may be a web-based internet shopping mall, a home shopping mall, a social networking service (SNS) shopping mall, or the like. The seller server 240 may be implemented based on at least one server level computer device.

A buyer 220 may purchase a product by accessing an online shopping mall using the buyer terminal 210 or a computer device (PC, or the like) authenticated with a buyer account and ordering a desired product. The seller server 240 may perform order processing and the like in an online shopping mall. The buyer terminal 210 may be a mobile device of a buyer, such as a cellular phone, a laptop computer, and a tablet PC. The buyer terminal 210 may be a network device equipped with a memory, a processor, an information input/output unit, an auxiliary storage device, a camera, a microphone, a speaker, a short range wireless communication module, and the like, and capable of accessing a wide area communication network such as the Internet.

The buyer terminal 210 may interwork with a control server 230. The control server 230 may perform overall control, server-side calculation and data storage necessary for a method of automatically registering a product review according to preferred embodiments of the present invention. The control server 230 may interwork with the buyer terminal 210, the seller server 240, a courier server 260, and a telecommunication company 280. This control server 230 may be implemented based on at least one server level computer device.

Figure 15:
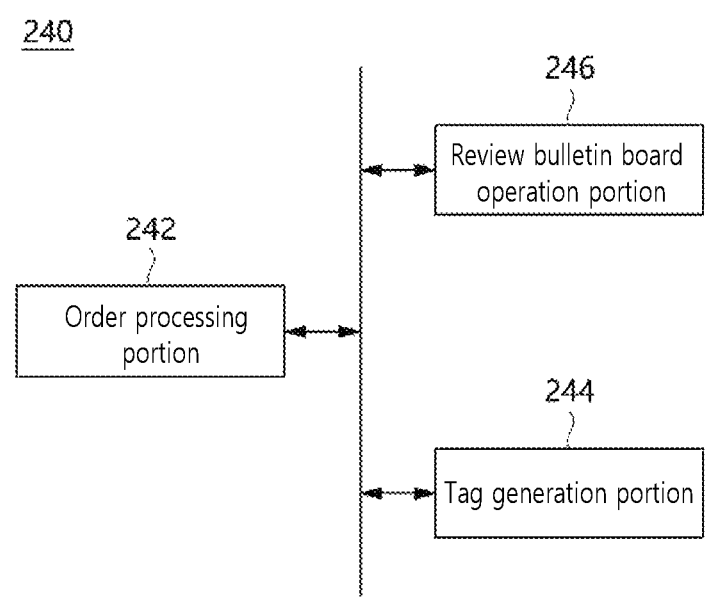
FIG. 15 is a block diagram illustrating the configuration of the seller server illustrated in FIG. 14.

FIG. 15 is a block diagram illustrating the configuration of the seller server 240 illustrated in FIG. 14.

As illustrated in FIG. 14, the seller server 240 according to a third embodiment of the present invention may include an order processing portion 242, a tag generation portion 244, and a review bulletin board operation portion 246. Each of the portions 242 to 246 may interwork with each other or one another.

The order processing portion 242 may receive an order request for ordering a product from the buyer terminal 210 in an online shopping mall and perform payment and delivery according to the order request. For example, the order request may include identification information of the buyer terminal 210 and order identification information for identifying the order.

The tag generation portion 244 may store the identification information of the buyer terminal 210, the order identification information, and a URL of a review bulletin board for uploading a purchase review of the product in a short range wireless communication tag. The review bulletin board operation portion 246 may operate a review bulletin board. The review bulletin board may be accessed based on the URL.

The short range wireless communication tag may be attached to a product package corresponding to the product and conveyed to the courier 270. When the product package is conveyed to the buyer 220 through the courier 270, the buyer terminal 10 may recognize the short range wireless communication tag, verify an actual buyer based on the order identification information and the identification information of the buyer terminal 210, and then automatically connect the buyer terminal 10 to the review bulletin board using the URL of the review bulletin board.

First, also in the third preferred embodiment of the present invention, the installation process of the application described above with reference to FIG. 3 is performed in the same way. In the process, the buyer terminal 210 is authenticated and the identification number of the buyer terminal 210 is stored in the database of the control server 230. The installation file of the application may be delivered to the buyer terminal 210 by the control server 230 or delivered to the buyer terminal 210 through an application store such as Google Store.

Figure 16:
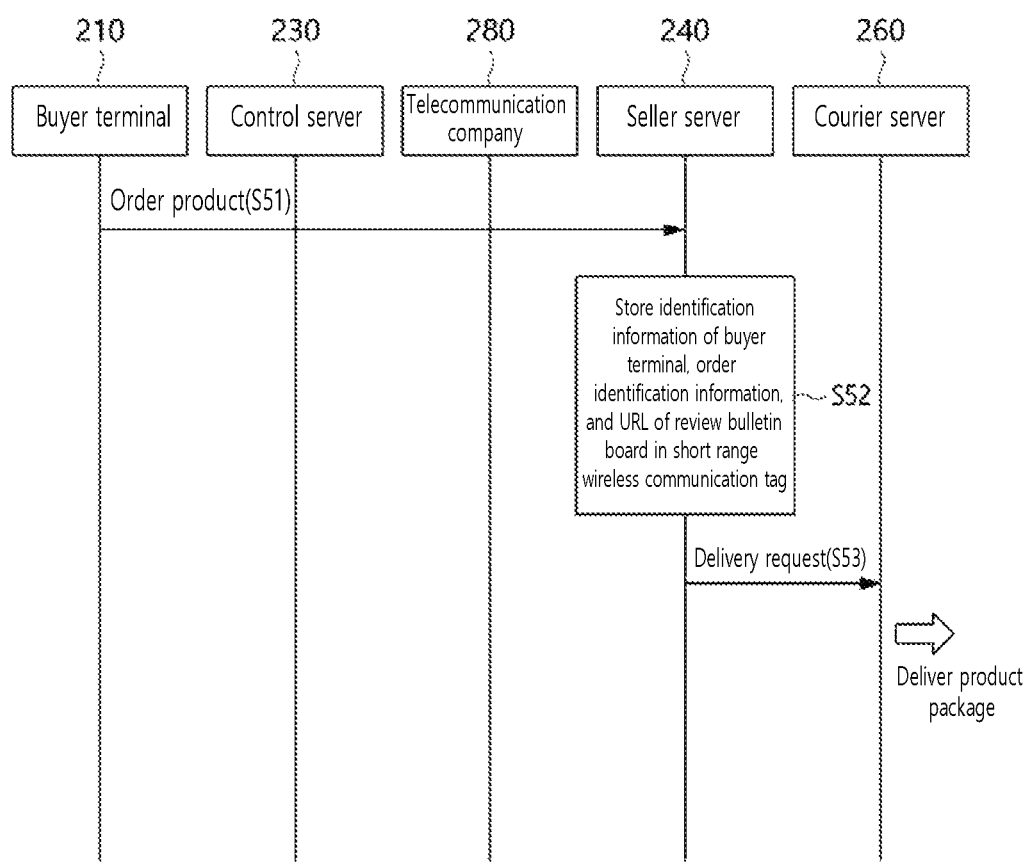
FIG. 16 is a flowchart illustrating the flow up to delivery of a product package according to a third preferred embodiment of the present invention.

FIG. 16 is a flowchart illustrating the flow up to delivery of a product package according to a third preferred embodiment of the present invention.

A buyer 220 may purchase a product by accessing an online shopping mall using the buyer terminal 210 or a computer device authenticated with a buyer account and ordering a desired product. An order request generated when a product is ordered may be transferred to the seller server 240.

As illustrated in FIG. 16, the buyer terminal 210 may transmit an order request for a product to the seller server 240 (stage: S51). The order request may include identification information of the buyer terminal 210 and order identification information for identifying the order. The identification information of the buyer terminal 210 may be, for example, a phone number corresponding to the buyer terminal 210.

In response to the order request, the seller server 240 may store the identification information of the buyer terminal 210, the order identification information, and the URL of a review bulletin board for uploading a purchase review of the product in the short range wireless communication tag (stage: S52). The short range wireless communication tag may be an NFC (Near Field Communication) tag and a RFID (Radio Frequency Identification) tag. The review bulletin board may be operated by the review bulletin board operation portion 246.

The seller server 40 may transmit the order identification information and the identification information of the buyer terminal 10 to the control server 30, and the control server 30 may store the transmitted order identification information and identification information of the buyer terminal 10 in a database.

The short range wireless communication tag may be attached to a product package corresponding to the product. For example, the short range wireless communication tag may be attached to the product, attached to a wrapping paper or packaging box for packaging the product, or attached to the inside or outside of a delivery box of the product.

In addition, a light response module, for example, a light response chip, may be attached to a product package. When light greater than or equal to a threshold value is sensed, the light response module of the third preferred embodiment of the present invention may be the same as the light response module of the first embodiment, for example, that transmits a control signal. The control signal may execute a code recognition module of the buyer terminal 210.

This light response module may be attached to a position that satisfies the condition of transmitting a control signal by receiving light greater than or equal to a threshold value when a product package is opened while receiving light less than the threshold value in the finished state of the product package. For example, the light response module may be attached to wrapping paper or a packaging box for packaging the product, or attached to the inside of a delivery box of the product.

According to another embodiment of the present invention, the short range wireless communication tag and the light response module may be formed of the same chip. For example, information of a short range wireless communication tag may be included in a light response module.

Figure 17:
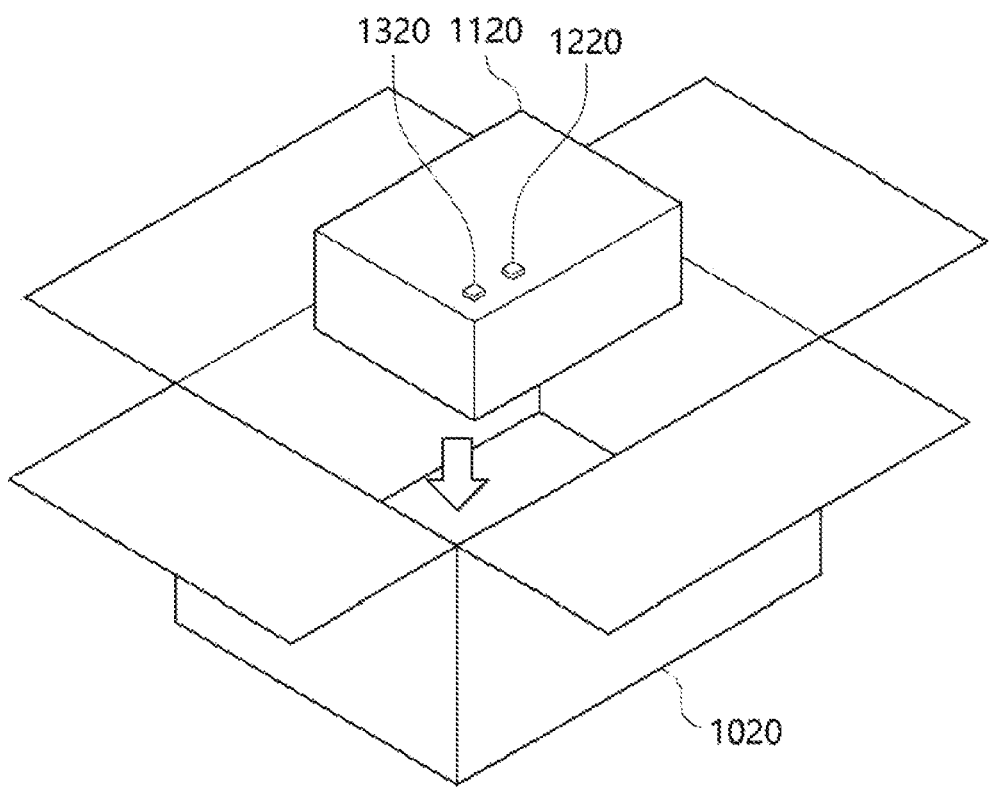
FIG. 17 is an exemplary view exemplarily illustrating packaging with a short range wireless communication tag attached to a product package according to the third preferred embodiment of the present invention.

FIG. 17 is an exemplary view exemplarily illustrating packaging with a short range wireless communication tag attached to a product package according to the third preferred embodiment of the present invention.

As illustrated in FIG. 17, a short range wireless communication tag 1220 may be attached to one side of a packaging box 1120 of a product. In addition, a light response module 1320, for example, a light response chip, may be attached to the other side of the packaging box 1120. The light response module 1320 may transmit a control signal when light greater than or equal to a threshold value is sensed. The control signal may execute a tag recognition module of the buyer terminal 210.

As such, in the example illustrated in FIG. 17, the packaging box 1120 of a product to which the short range wireless communication tag 1220 and the light response module 1320 are attached is packaged by a delivery box 1020 to complete a product package.

The seller server 240 may transmit a delivery request to the courier server 260 (S53). Then, the courier 270 may collect the product package and deliver the same to the buyer 220. The buyer 220 may receive the product package delivered by the courier 270.

Figure 18:
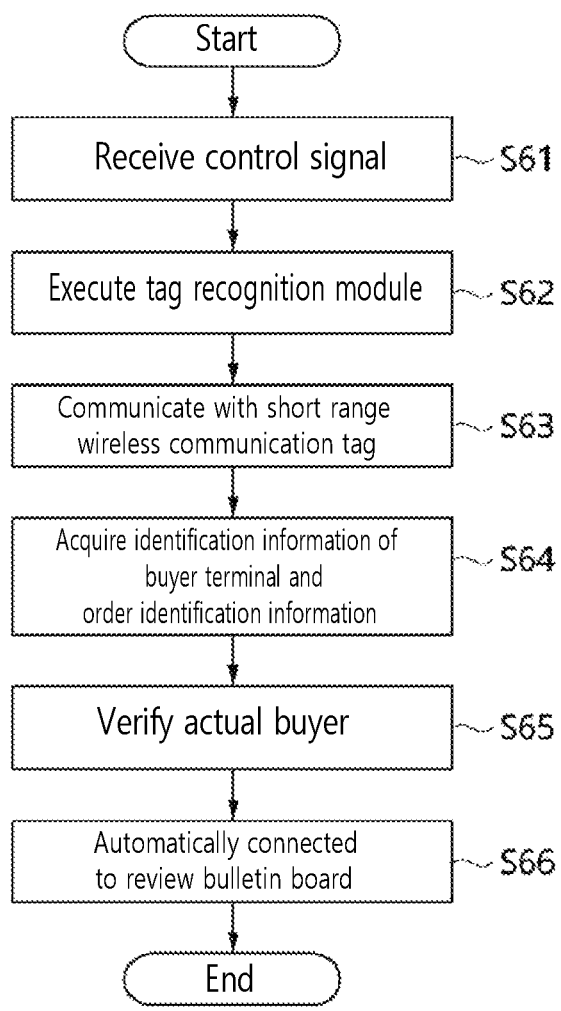
FIG. 18 is a flowchart illustrating a process of automatically registering a product review after a buyer receives a product package according to the third preferred embodiment of the present invention.

FIG. 18 is a flowchart illustrating a process of automatically registering a product review after the buyer 220 receives a product package according to the third preferred embodiment of the present invention.

As illustrated in FIG. 18, the buyer 220 receiving a product package may open the product package to take out a product. When the product package is opened, an internally attached light response module may sense light greater than or equal to a threshold value and send a control signal. Then, the buyer terminal 210 receives the control signal (stage: S61). The buyer terminal 210 receiving the control signal may execute a code recognition module (stage: S62). According to another embodiment of the present invention, when the light response module is not attached, a buyer may directly execute the tag recognition module, or the buyer terminal 210 may set the tag recognition module to be always active.

Figure 19:
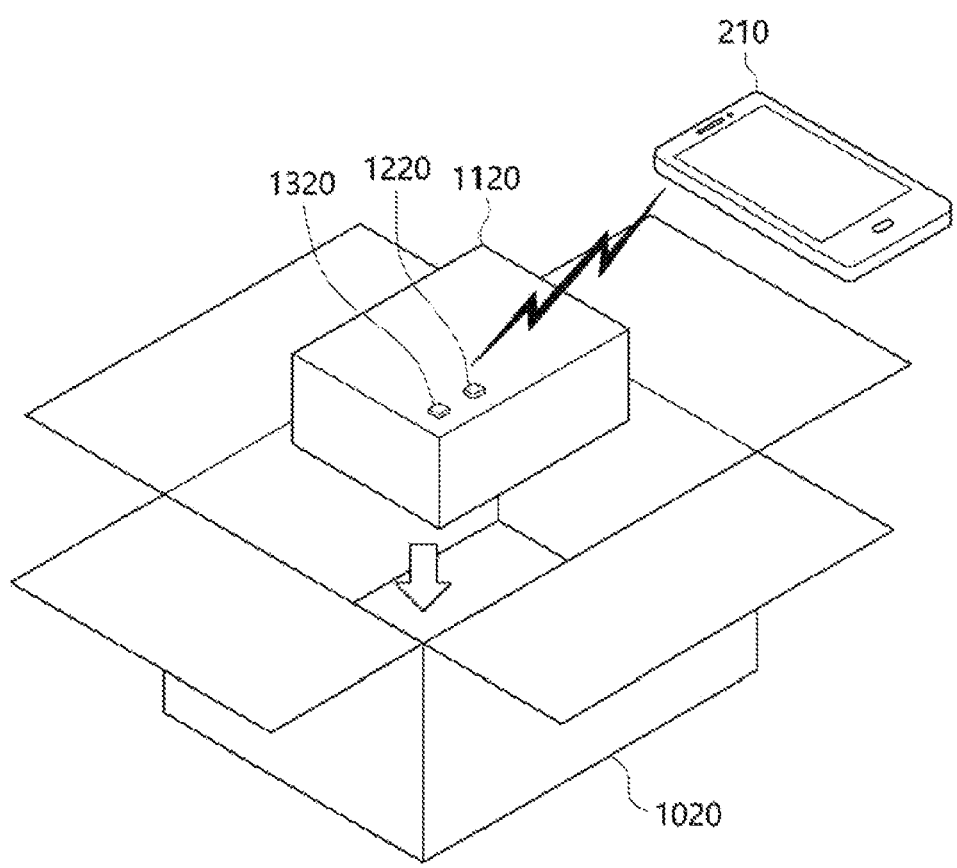
FIG. 19 is an exemplary diagram exemplarily illustrating communication between a short range wireless communication tag attached to a product package and a buyer terminal.

Next, the buyer terminal 210 may communicate with the short range wireless communication tag attached to the product package based on a code recognition module (stage: S63). FIG. 19 is an exemplary diagram exemplarily illustrating acquisition of information from the short range wireless communication tag attached to a product package. As illustrated in FIG. 19, the buyer terminal 210 may communicate with the short range wireless communication tag 1220 attached to the packaging box 1120 using the tag recognition module activated according to the control signal of the light response module 1320 when the packaging box 1120 in which a product is packaged from the delivery box 1020 is taken out.

The buyer terminal 210 may acquire the identification information of the buyer terminal 210, the order identification information, and a review bulletin board URL from the short range wireless communication tag (stage: S64). The buyer terminal 210 may perform actual buyer verification using the acquired order identification information and identification information of the buyer terminal 210 (stage: S65).

For example, the buyer terminal 210 may transmit an actual buyer authentication request including the acquired order identification information and identification information of the buyer terminal 210 to the control server 230. The control server 230 may verify an actual buyer in response to the actual buyer authentication request. For example, the control server 230 may verify the actual buyer by comparing the order identification information and identification information of the buyer terminal 210 transmitted from the buyer terminal 210 with the order identification information and identification information of the buyer terminal 210 stored in the database.

When the verification is completed, the control server 230 may transmit a result of confirming the actual buyer to the buyer terminal 210. For example, when it is confirmed that the buyer terminal 210 corresponding to a buyer is an actual buyer, the control server 230 may transmit a confirmation result indicating the actual buyer to the buyer terminal 210, and in response thereto, the buyer terminal 210 may be automatically connected to the review bulletin board based on a review bulletin board URL (stage: S66). When it is confirmed that the buyer terminal 210 is not an actual buyer, an error message may be generated and a message indicating retry may be displayed.

As described above, according to the third preferred embodiment of the present invention, by using a short range wireless communication tag such as RFID or NFC attached to a product package to verify an actual buyer and automatically connect the same to a review bulletin board, the buyer 220 can easily upload product review(s) and the seller 250 can easily collect reliable product review(s).

Based on the aforementioned automatic connection of the buyer terminal 210 to the review bulletin board according to the first to third preferred embodiments of the present invention, the automatic product review registration method according to the preferred embodiment of the present invention allows a buyer to input a review by selecting various type of review progress methods.

Figure 20:
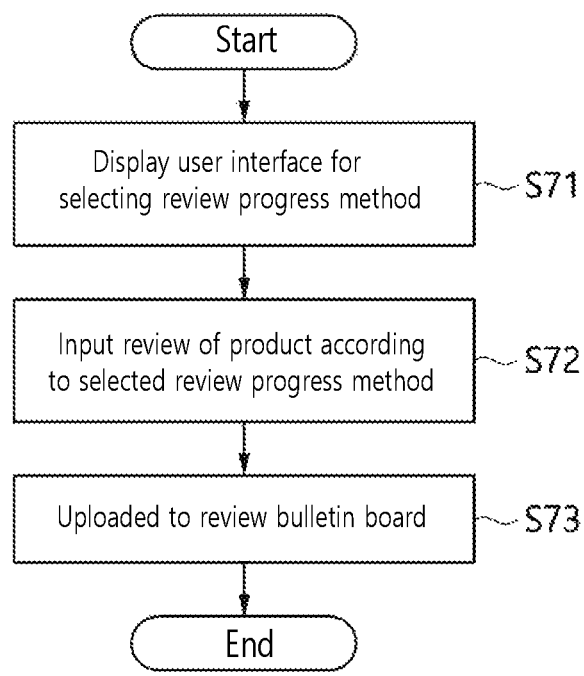
FIG. 20 is a flowchart illustrating the flow of a product review registration process based on selection of a review proceeding method according to a preferred embodiment of the present invention.

FIG. 20 is a flowchart illustrating the flow of a product review registration process based on selection of a review proceeding method according to a preferred embodiment of the present invention. In the following description, the buyer terminal uses the same reference numeral as in the third embodiment described above. However, this is not a limitation, and the following buyer terminal is applicable to any of the buyer terminals mentioned in the first to third embodiments.

As illustrated in FIG. 20, the buyer terminal 210 may display a plurality of review progress methods for inputting product review(s) in response to a review request signal of a product, and display a user interface capable of selecting at least one review progress method (stage: S71). This stage may be performed by a user interface display portion of the buyer terminal 210.

Next, the buyer terminal 210 may input a review of the product according to a review progress method selected based on the user interface (stage: S72). This stage may be performed by a review input portion of the buyer terminal 210. The buyer terminal 210 may upload the input review of the product to the review bulletin board based on a URL of the review bulletin board (stage: S73). This stage may be performed by an upload portion of the buyer terminal 210.

The review progress method includes a short answer method, a voice recognition method, a finger gesture method, a face recognition method, and the like. The short answer method may be a short answer method for responding to a predetermined question. For example, the short answer method may be a review progress method in which questions asking for a satisfaction level are displayed on a screen for a plurality of items, such as quality, quantity, delivery, thickness of clothing, size, service, etc., and a buyer inputs answers to the questions.

The voice recognition method is a progress method of inputting a product review based on recognition of a buyer voice. This voice recognition method may include a narrative type and a short answer type. The narrative method may be a method in which a buyer speaks his/her review after receiving a product, and the buyer terminal 210 recognizes the buyer voice, converts the same into text, and then uploads the same to a bulletin board. The short answer method may be a method of displaying a question asking for a satisfaction level for a predetermined item on a screen or being guided by voice, and allowing the buyer to speak the satisfaction level in a short answer format, and then recognizing the buyer voice and inputting the satisfaction level.

Figure 21:
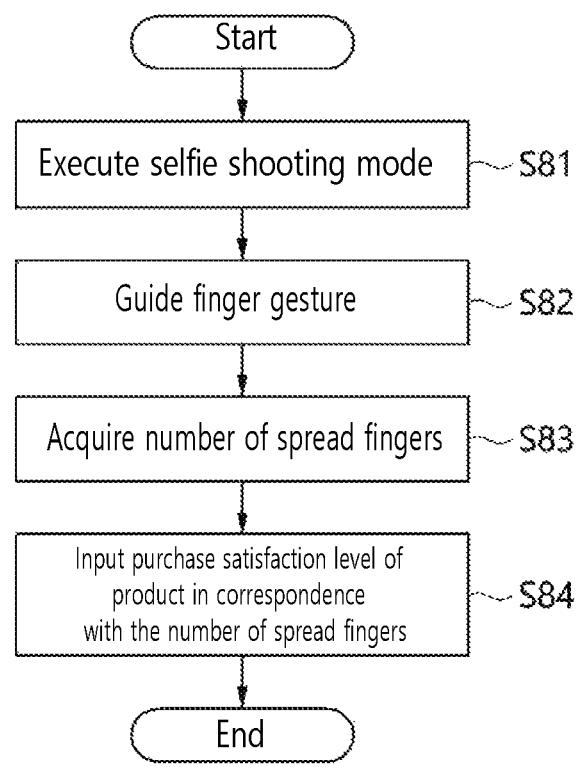
FIG. 21 is a flowchart illustrating a product review input process based on a finger gesture method.

The finger gesture method is a method of inputting a review based on a finger gesture of a buyer. FIG. 21 is a flowchart illustrating a product review input process based on a finger gesture method.

As illustrated in FIG. 21, the buyer terminal 210 may execute a selfie shooting mode of the buyer terminal 210 (stage: S81). Subsequently, the buyer terminal 210 may guide a buyer to spread his or her fingers in the number corresponding to the satisfaction level of the purchase satisfaction item for the product in a state where the buyer makes a first so as to be reflected on a camera (stage: S82).

Then, the buyer may spread his or her fingers in the number corresponding to the satisfaction level for each item of the product in a state where the buyer makes a first so that his or her hand is reflected on the camera, and the buyer terminal 210 may acquire the number of fingers spread by the buyer based on the captured image (stage: S83).

The buyer terminal 210 may input the satisfaction level for each satisfaction item by corresponding the purchase satisfaction level for the corresponding item of the product in correspondence with the number of fingers acquired for each satisfaction item (stage: S84). For example, after instructing a buyer to "Mark the satisfaction level for the quality of the purchased clothing with your fingers," when the buyer spreads four fingers while making a fist, the buyer terminal 210 may sense that the four fingers are spread based on gesture recognition, convert the same into "4 points" or a score corresponding thereto as registration of satisfaction with respect to the quality of the clothes, and register the satisfaction level on a review bulletin board.

Figure 22:
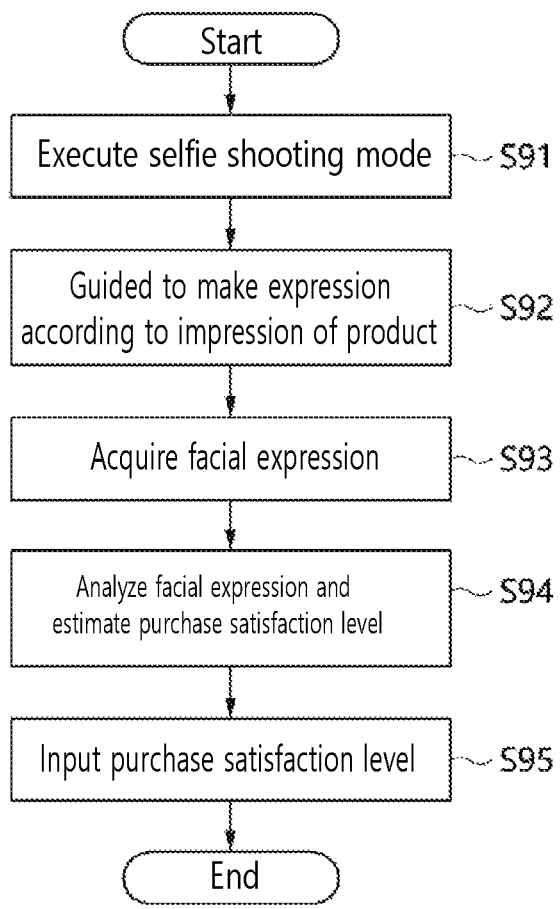
FIG. 22 is a flowchart illustrating a product review input process based on a face recognition method.

A face recognition method may refer to a method of inputting a review by recognizing a facial expression of the buyer. FIG. 22 is a flowchart illustrating a product review input process based on a face recognition method.

As illustrated in FIG. 22, the buyer terminal 210 may execute a selfie shooting mode of the buyer terminal 210 (stage: S91). Subsequently, the buyer terminal 210 may guide a buyer to make an expression according to the buyer's impression of a product so as to be reflected on a camera (stage: S92). Then, the buyer makes an expression according to the impression of the product while looking at the camera.

The buyer terminal 210 may acquire the facial expression of a buyer based on the captured image (stage: S93), and estimate purchase satisfaction corresponding to the product based on analysis of the acquired facial expression of the buyer (stage: S94). Then, the estimated purchase satisfaction may be input to a review bulletin board (stage: S95).

For example, a buyer may make various expressions as an impression of seeing a product, and the buyer terminal 210 may acquire a facial expression of the buyer, analyze an expression of the buyer, and estimate an emotion such as satisfaction, joy, anger, sadness, laughter, and the like, and then the estimated emotion may be displayed by uploading the same to a review bulletin board using an icon or text of a corresponding expression.

According to the method of automatically registering a product review by automatically accessing the buyer terminal to the review bulletin board and the method that allows a buyer to enter a review by selecting various types of review progress methods based thereon according to the first to third embodiments described above, the buyer can easily register product review(s), and sellers, that is, shopping malls, can easily collect product review(s). Furthermore, by integrating the product reviews collected by shopping mall, it is possible to build a large amount of big data related to product reviews related to product reviews.

Since the big data related to product reviews is big data of important information that actual buyers refer to when selecting products the buyers intend to purchase, an embodiment of the present invention builds a platform to evaluate these product reviews to further improve the reliability of product reviews by providing product review evaluations indicating the reliability of product reviews during product search, and based thereon, realize a shopping mall ecosystem based on product reviews that enables e-commerce based on product review search.

Hereinafter, a product review evaluation method and a product review search method according to a preferred embodiment of the present invention will be described.

Figure 23:
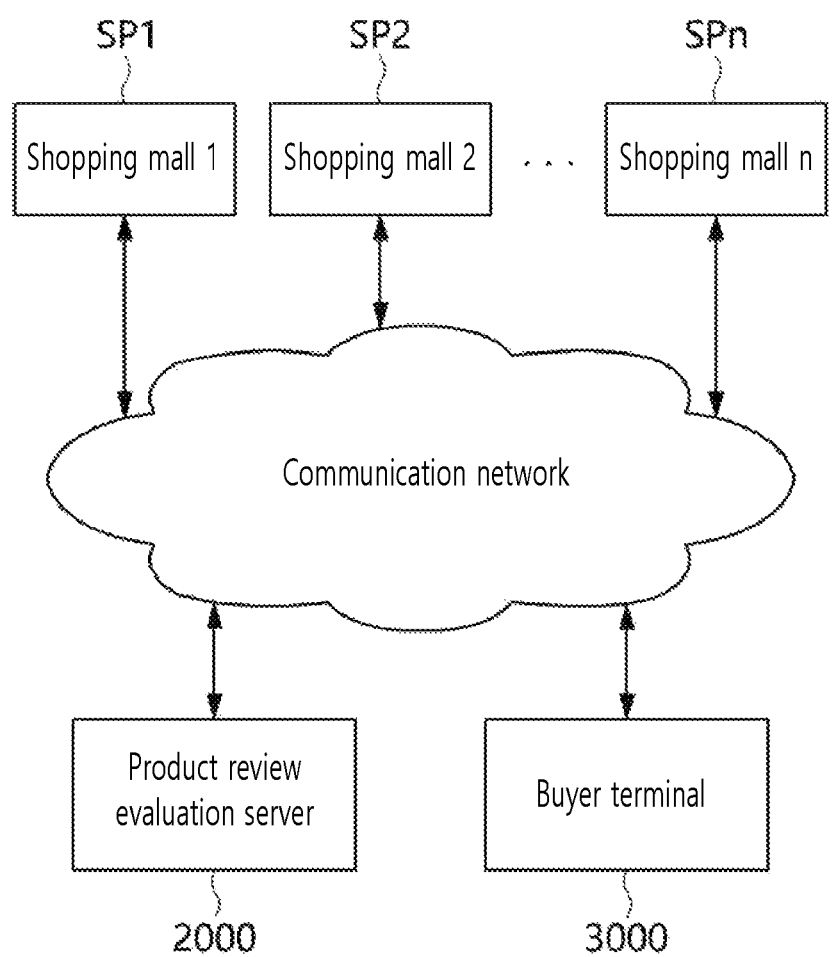
FIG. 23 is a block diagram illustrating a system configuration for realizing a product review evaluation method according to a preferred embodiment of the present invention.

FIG. 23 is a block diagram illustrating a system configuration for realizing a product review evaluation method according to a preferred embodiment of the present invention.

As illustrated in FIG. 23, a product review evaluation server 2000 may interwork with a buyer terminal 3000 and a plurality of shopping malls SP1, . . . , SPn through a communication network. The shopping mall SP may be an e-commerce server that sells products based on online. A buyer may access the shopping mall SP using the buyer terminal 3000 authenticated with a buyer account, and order and purchase products. The buyer terminal 3000 may be a network computer device such as a mobile phone, a laptop computer, a PC, and a tablet PC.

The product review evaluation server 2000 may perform a product review search requested by the buyer terminal 3000 to provide a search result, and may receive and update a review evaluation corresponding to the product review information from the buyer terminal 3000, and store and manage the same in a database (not shown) when a decision to purchase a product is made based on product review information provided as a search result.

Figure 24:
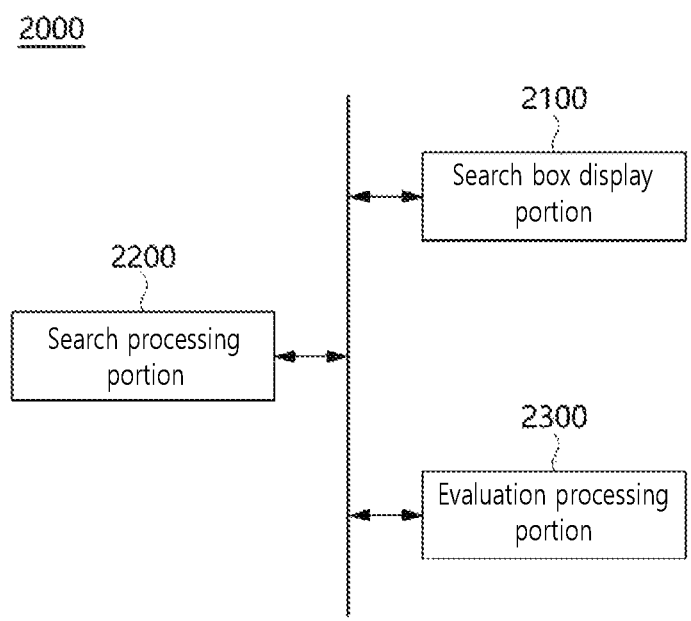
FIG. 24 is a block diagram illustrating the configuration of the product review evaluation server illustrated in FIG. 23.

FIG. 24 is a block diagram illustrating the configuration of the product review evaluation server 2000 illustrated in FIG. 23.

As illustrated in FIG. 24, the product review evaluation server 2000 may include a search box display portion 2100, a search processing portion 2200, and an evaluation processing portion 2300. Each of the portions 2000 to 2300 may be implemented based on at least one computer terminal, and each of the portions 2000 to 2300 may interwork with each other or one another.

The search box display portion 2100 may display a search box capable of searching product reviews on the buyer terminal 3000. The search processing portion 2200 may input a keyword based on the search box, extract at least one product review information as a search result corresponding to the input keyword, and display the extracted product review information on the buyer terminal 3000.

The evaluation processing portion 2300 may input a review evaluation corresponding to the product review from the buyer terminal 3000 when a purchase decision is made in the shopping mall SP introduced based on the displayed product review information. The evaluation processing portion 2300 may update a review evaluation of a product review based on the review evaluation input from the buyer terminal 3000 and store the updated review evaluation in a database in association with the product review.

Figure 25:
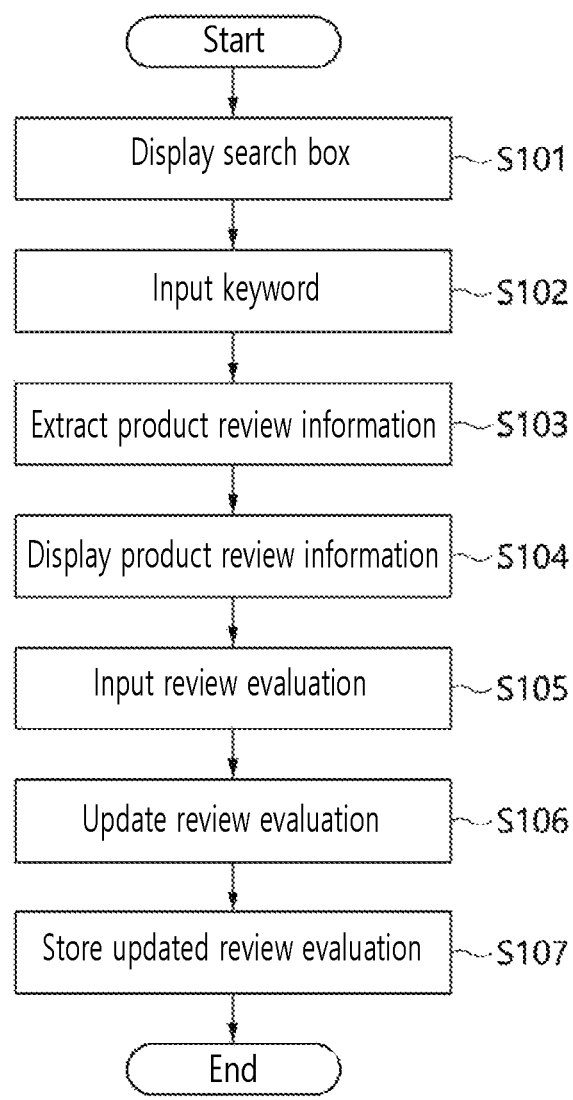
FIG. 25 is a flowchart illustrating the flow of a product review evaluation method according to a preferred embodiment of the present invention by the operation of a product review evaluation server.

FIG. 25 is a flowchart illustrating the flow of a product review evaluation method according to a preferred embodiment of the present invention by the operation of the product review evaluation server 2000. In the following description, the operation process of the product review evaluation server 2000 is described in more detail and clearly.

Referring to FIGS. 23 to 25, a search box display portion 2100 of the product review evaluation server 2000 may display a search box capable of searching for product reviews on a screen of the buyer terminal 3000 (stage: S101).

Figure 26:
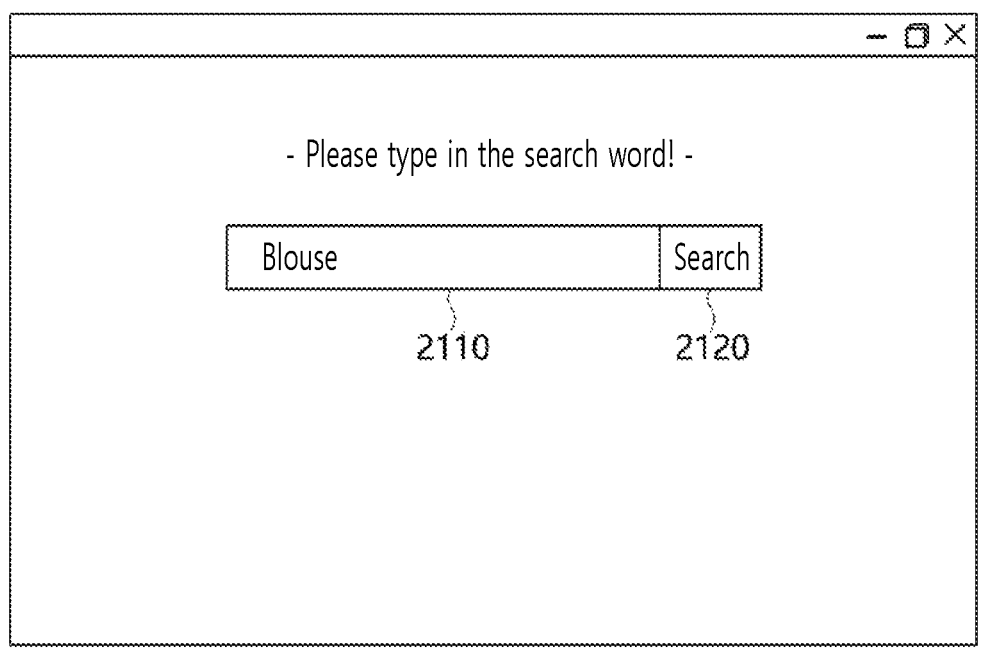
FIG. 26 is an exemplary diagram exemplarily illustrating a search box displayed on a buyer terminal by a search box display portion.

FIG. 26 is an exemplary diagram exemplarily illustrating a search box displayed on a buyer terminal by the search box display portion 2100. As illustrated in FIG. 26, a search box 2110 is displayed and a buyer may input a desired product type for search as a keyword. For example, in the example illustrated in FIG. 26, "blouse" is input as a keyword. The buyer may select a search button 2120 or select an enter key after inputting a keyword into the search box.

Then, when a keyword is input through a search box, the search processing portion 2200 of the product review evaluation server 2000 may input a keyword into the product review evaluation server 2000 based on the search box (stage: S102).

Next, the product review evaluation server 2000 may extract at least one product review information as a search result corresponding to the input keyword (stage: S103), and display the extracted product review information on the buyer terminal 3000 (stage: S104). For example, the product review evaluation server 2000 may extract a plurality of pieces of product review information from a plurality of different shopping malls SP1, . . . , SPn.

The product review information may include shopping mall identification information for identifying a shopping mall that sold a product corresponding to product review information, order identification information corresponding to the product review information, product identification information for identifying a product corresponding to the product review information, a product review corresponding to the product review information, a URL linking to the product review and/or product purchase page, a review evaluation corresponding to the product review information, reviewer information corresponding to the product review information, and writer evaluation corresponding to writer information of the product review.

Figure 27:
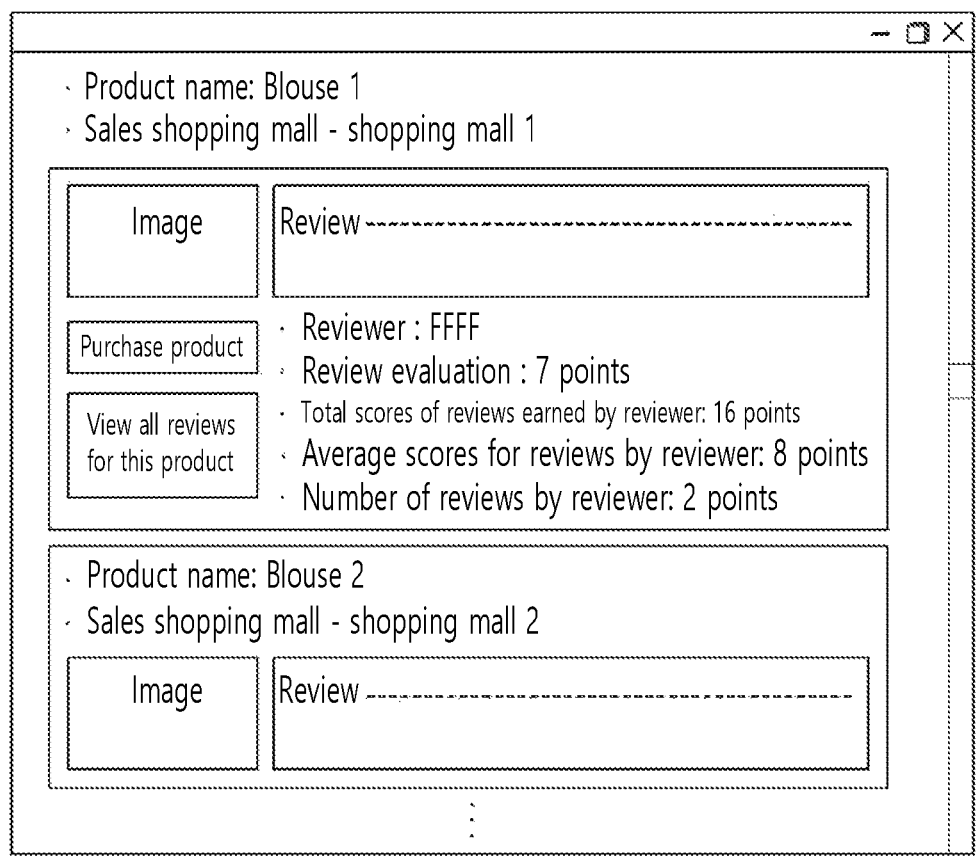
FIG. 27 is an exemplary diagram exemplarily illustrating product review information displayed on a buyer terminal by a product review evaluation server.

FIG. 27 is an exemplary diagram exemplarily illustrating product review information displayed on the buyer terminal 3000 by the product review evaluation server 2000.

As illustrated in FIG. 27, a list of the extracted product review information may be displayed on a screen of the buyer terminal 3000. Each piece of the product review information may display product identification information for identifying a product corresponding to the product review information, for example, "product name—blouse 1" and shopping mall identification information for identifying the shopping mall SP that sold the product corresponding to the product review information, for example, "sales shopping mall—shopping mall 1."

In addition, the displayed product review information may include a product review corresponding to the product review information. The product review may include at least one of a product captured image and review content.

The displayed product review information may include a URL linkable to the product review and/or product purchase page, for example, a hyperlink to a product captured image or review content, or a separate icon, for example, "buy product" icons may be displayed.

The displayed product review information may include a review evaluation corresponding to the product review information. This is a review evaluation score, and when displayed on the buyer terminal 3000, it may be displayed through a grade, score, star rating, and the like.

For example, assuming that the review evaluation of a product is a score from 0 to 10, the review evaluation may be marked as a score such as "The review evaluation of this product review is 7 points" or as the number of stars corresponding to the score. Grades may be displayed by setting the grades such as "Low Review Reliability" from 0 to 3 points, "Fair Review Reliability" from 4 to 6 points, and "High Review Reliability" from 7 to 10 points, or icons indicating the grades may be displayed.

In addition, the displayed product review information may include reviewer information corresponding to product review information, for example, "review author—FFFF," writer evaluation corresponding to writer information of the product review, and the number of reviews corresponding to the writer information of the product review.

The reviewer information is a hash value based on a user name and user phone number, and may be uniquely identified even when the same reviewer uses different IDs in different shopping malls SP. For example, since the product review evaluation server 2000 extracts a plurality of pieces of product review information from a plurality of different shopping malls SP1, . . . , SPn, even the same buyer may use a different ID for each shopping mall SP. Accordingly, by generating a hash value based on the user name and user phone number and using the same as a unique identifier, the reliability of the review evaluation can be increased by increasing the discrimination of a reviewer.

The reviewer evaluation may include at least one of a sum of the scores of a review evaluation of product reviews corresponding to the reviewer information, for example, "a total score of a review evaluation acquired by reviewers" and an average of the scores of a review evaluation of product reviews corresponding to the reviewer information, for example, "an average score per review of reviewers."

A buyer may order a product by accessing the shopping mall SP based on a URL linking to the product review and/or product purchase page by referring to the product review information displayed on the buyer terminal, and make a purchase decision after receiving the product.

As such, when a purchase decision is made in the shopping mall SP introduced based on the displayed product review information, the product review evaluation server 2000 may input a review evaluation corresponding to the product review from the buyer terminal 3000 (in other words, the review evaluation input from the buyer terminal is received) (stage: S105).

Herein, the method for inputting a review evaluation corresponding to a product review may also be performed by adding a configuration for a review evaluation to the same concept as at least one of the first to third embodiments of the method for automatically registering product reviews mentioned above and the method for registering selective product reviews.

For example, an embodiment of the present invention further includes a review evaluation registration URL for inputting a review evaluation in the encrypted code attached to the product package mentioned in the first embodiment of the method for automatically registering a product review, so that when the product package is opened, the buyer terminal recognizes the encrypted code and automatically accesses the web page for review evaluation registration, further includes a review registration URL for inputting a review evaluation in the hash mentioned in the second embodiment of the method for automatically registering a product review, so that when the product package is opened, the buyer terminal automatically accesses the web page for review registration based on the reproduction and acquisition of sound waves, or further includes a review registration URL for inputting a review evaluation in the short range wireless communication tag attached to the product package mentioned in the third embodiment of the method for automatically registering a product review, so that when the product package is opened, the buyer terminal recognizes the short range wireless communication tag and automatically accesses the web page for review evaluation registration, thereby facilitating input of review evaluations.

In these cases, the application of the buyer terminal may sequentially control the URL of the review bulletin board of a product to be automatically accessed and input product reviews first, and then access the review evaluation registration URL to input review evaluations.

In addition, an embodiment of the present invention may also display a plurality of review evaluation progress methods for inputting a review evaluation in response to a review evaluation request signal of a product review after performing the selective product review registration method described above and display a user interface that allows selection of at least one review evaluation progress method, input a review evaluation of the product review according to a review evaluation progress method selected based on the user interface, and upload the review evaluation based on a review registration URL.

The review evaluation progress method may be any one of a short answer method of responding to a predetermined question, a voice recognition method of recognizing the voice of a buyer who has purchased a product and inputting a review evaluation, a finger gesture method of inputting a review evaluation based on a finger gesture of a buyer, and a face recognition method of inputting an evaluation review by recognizing a facial expression of the buyer.

Subsequently, the product review evaluation server 2000 may update the review evaluation of the product review based on the review evaluation input from the buyer terminal 3000 (stage: S106). Subsequently, the product review evaluation server 2000 may store the updated review evaluation in a database in association with the product review (stage: S107).

The product review server 2000 may update a writer evaluation based on the updated review evaluation and store the updated writer evaluation in a database in association with the writer information.

Figure 28:
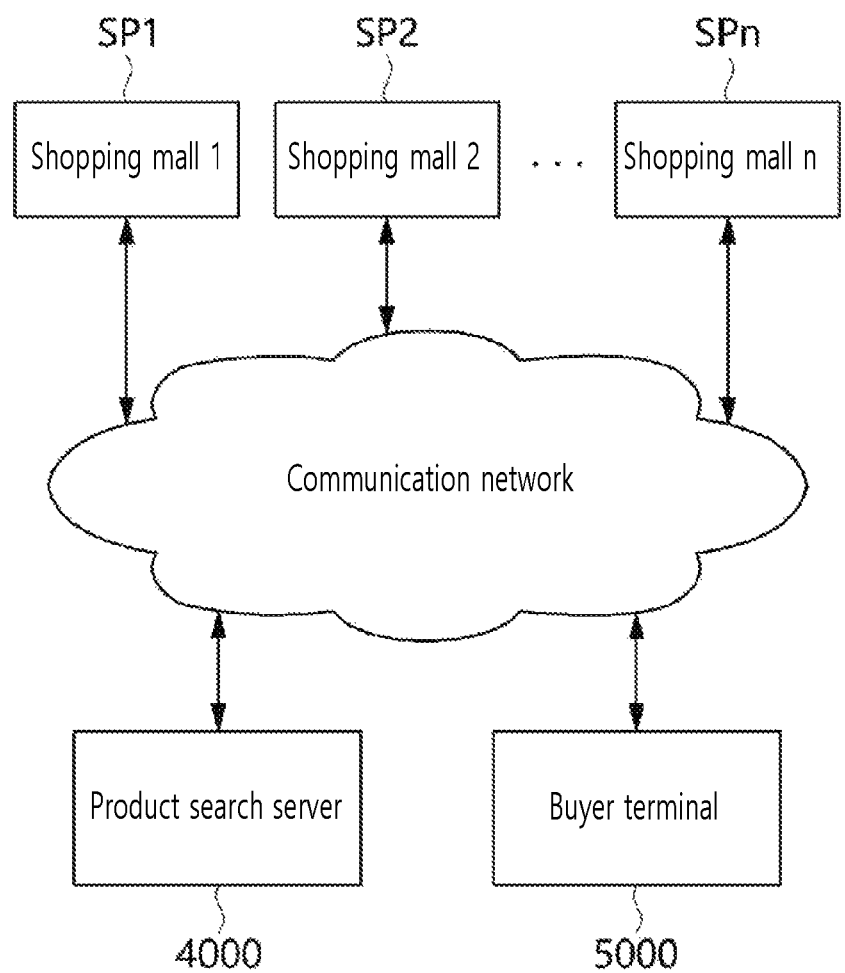
FIG. 28 is a block diagram illustrating the configuration of a system for realizing a product search method according to a preferred embodiment of the present invention.

FIG. 28 is a block diagram illustrating the configuration of a system for realizing a product search method according to a preferred embodiment of the present invention. Hereinafter, the product search method according to a preferred embodiment of the present invention will be described.

As illustrated in FIG. 28, a product search server 4000 may interwork with a buyer terminal 5000 and a plurality of shopping malls SP1, . . . , SPn through a communication network. The shopping mall SP may be an e-commerce server that sells products based on online. A buyer may access the shopping mall SP using the buyer terminal 5000 authenticated with a buyer account, and order and purchase products. The buyer terminal 5000 may be a network computer device such as a mobile phone, a laptop computer, a PC, and a tablet PC.

The product search server 4000 display a search box on the buyer terminal 5000, input a keyword based on the search box, extract product information corresponding to the input keyword, and then extract at least one piece of product review information corresponding to the product information and display the extracted at least one piece of product review information on a screen of the buyer terminal 5000 in association with the product information.

Figure 29:
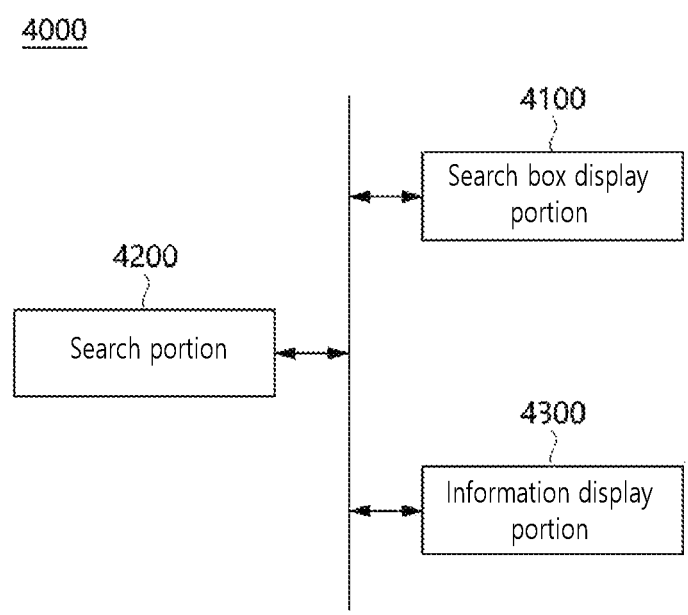
FIG. 29 is a block diagram illustrating the configuration of the product search server illustrated in FIG. 28.

FIG. 29 is a block diagram illustrating the configuration of the product search server 4000 illustrated in FIG. 28.

As illustrated in FIG. 29, the product review evaluation server 4000 may include a search box display portion 4100, a search portion 4200, and an information display portion 4300. Each of the portions 4100 to 4300 may be implemented based on at least one computer terminal, and each of the portions 4100 to 4300 may interwork with each other or one another.

The search box display portion 4100 may display a product search box on the buyer terminal 5000. The search portion 4200 may input a keyword based on the search box, extract product information corresponding to the input keyword, and extract at least one piece of product review information corresponding to the product information. The information display portion 4300 may associate at least one piece of extracted product review information with the product information and display the same on the buyer terminal 5000.

Figure 30:
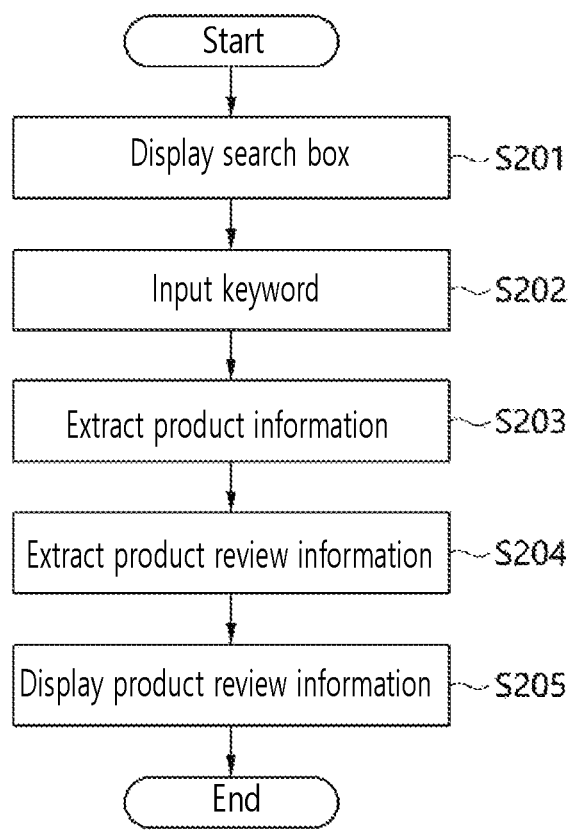
FIG. 30 is a flowchart illustrating the flow of a product search method according to a preferred embodiment of the present invention by the operation of a product search server.

FIG. 30 is a flowchart illustrating the flow of a product search method according to a preferred embodiment of the present invention by the operation of the product search server 4000. In the following description, the operation process of the product search server 4000 will be described in more detail and clearly.

First, the product search server 4000 may display a product search box on the buyer terminal 5000 (stage: S201). Then, a buyer may input a desired product as a keyword into the search box, and the product search server 4000 may input the keyword into the product search server 4000 based on the search box (stage: S202).

Then, the product search server 4000 may extract product information corresponding to the input keyword (stage: S203). Subsequently, the product search server 4000 may extract at least one piece of product review information corresponding to the extracted product information (stage: S204). The product search server 4000 may display at least one piece of the extracted product review information in association with product information (stage: S205).

The product search server 4000 may extract a plurality of pieces of product review information from a plurality of different shopping malls SP1, . . . , SPn. The product review information may include shopping mall identification information for identifying the shopping mall SP that sold a product corresponding to product review information, order identification information corresponding to the product review information, product identification information for identifying a product corresponding to the product review information, a product review corresponding to the product review information, a URL linking to the product review and/or product purchase page, a review evaluation corresponding to the product review information, reviewer information corresponding to the product review information, and writer evaluation corresponding to writer information of the product review.

For example, the product review information in this embodiment may be the same as the product review information mentioned in the previous embodiment of the product review evaluation method. A list of the extracted product review information may be displayed on a screen of the buyer terminal 5000. Each piece of the product review information may display product identification information for identifying a product corresponding to the product review information, for example, "product name—blouse 1" and shopping mall identification information for identifying the shopping mall SP that sold the product corresponding to the product review information, for example, "sales shopping mall—shopping mall 1."

In addition, the displayed product review information may include a product review corresponding to the product review information. The product review may include at least one of a product captured image and review content.

The displayed product review information may include a URL linkable to the product review and/or product purchase page, for example, a hyperlink to a product captured image or review content, or a separate icon, for example, "buy product" icons may be displayed.

The displayed product review information may include a review evaluation corresponding to the product review information. This is a review evaluation score, and when displayed on the buyer terminal, it may be displayed through a grade, score, star rating, and the like.

For example, assuming that the review evaluation of a product is a score from 0 to 10, the review evaluation may be marked as a score such as "The review evaluation of this product review is 7 points" or as the number of stars corresponding to the score. Grades may be displayed by setting the grades such as "Low Review Reliability" from 0 to 3 points, "Fair Review Reliability" from 4 to 6 points, and "High Review Reliability" from 7 to 10 points, or icons indicating the grades may be displayed.

In addition, the displayed product review information may include reviewer information corresponding to product review information, for example, "review author—FFFF," writer evaluation corresponding to writer information of the product review, and the number of reviews corresponding to the writer information of the product review.

The reviewer information is a hash value based on a user name and user phone number, and may be uniquely identified even when the same reviewer uses different IDs in different shopping malls SP1, . . . , SPn. For example, since the product review evaluation server extracts a plurality of pieces of product review information from a plurality of different shopping malls SP1, . . . , SPn, even the same buyer may use a different ID for each shopping mall SP. Accordingly, by generating a hash value based on the user name and user phone number and using the same as a unique identifier, the reliability of the review evaluation can be increased by increasing the discrimination of a reviewer.

The reviewer evaluation may include at least one of a sum of the scores of a review evaluation of product reviews corresponding to the reviewer information, for example, "a total score of a review evaluation acquired by reviewers" and an average of the scores of a review evaluation of product reviews corresponding to the reviewer information, for example, "an average score per review of reviewers."

Figure 31:
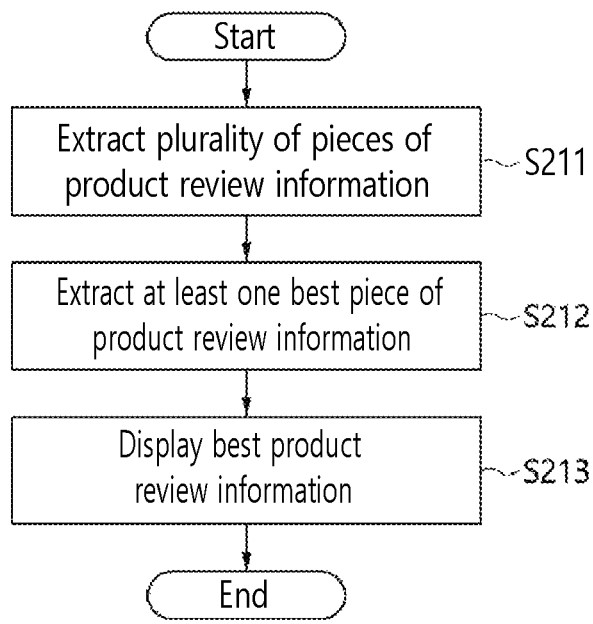
FIG. 31 is a flowchart illustrating a product review information extraction process of a product search method according to another preferred embodiment of the present invention.

FIG. 31 is a flowchart illustrating a product review information extraction process of a product search method according to another preferred embodiment of the present invention. According to another preferred embodiment of the present invention, after performing stages S201 to S203 described above, a process of extracting a plurality of pieces of product review information and extracting and displaying the best product review information is performed.

As illustrated in FIG. 31, the product search server 4000 may extract a plurality of pieces of product review information (stage: S211). Subsequently, the product search server 4000 may extract at least one best piece of product review information based on a plurality of review evaluations corresponding to the plurality of pieces of the extracted product review information (stage: S212).

For example, the product search server 4000 may extract a predetermined number of pieces of product review information having relatively high scores for a plurality of review evaluations corresponding to the plurality of pieces of the extracted product review information. The product search server 4000 may determine a predetermined number of pieces of the extracted product review information as the at least one best piece of product review information.

Next, the product search server 4000 may display at least one best piece of the extracted product review information on the buyer terminal 5000 in association with corresponding product information (stage: S213).

Hereinbefore, although the present invention has been described with reference to the preferred embodiment, it will be appreciated by those skilled in the pertinent technical field that the present invention may be modified and varied in various ways without departing from the technological details and scope of the present invention defined in the appended claims. Accordingly, a future change in the embodiments of the present invention will not depart from the technology of the present invention.

What is claimed is:

1. A method for evaluating a product review, the method being performed by a server and including:
   connecting the server to each of a plurality of different shopping malls of varying platforms;
   displaying a search box through which a review of a product is searched by accessing the connected plurality of different shopping malls, respectively, the search box displayed on a buyer terminal;
   receiving, from the buyer terminal, a keyword that is input via the search box;
   extracting product review information as a search result corresponding to the input keyword, the extracted product review information including shopping mall identification information for identifying a shopping mall of the plurality of different shopping malls which sold a product corresponding to the product review information and at least one piece of product review information from each of the plurality of different shopping malls;
   displaying the extracted product review information on the buyer terminal;
   inputting, from the buyer terminal, a review evaluation corresponding to the product review;
   updating a database of product reviews based on the review evaluation input from the buyer terminal; and
   storing the review evaluation in the database in association with the product review,
   wherein the database includes a previous review evaluation corresponding to the product review, the previous review evaluation updated when a purchase decision is made in one of the plurality of shopping malls based on the at least one piece of product review information displayed on the buyer terminal,
   wherein the product review information is extracted from each of the plurality of different shopping malls and indicates a specific shopping mall for each of the plurality of different shopping malls,
   wherein the displayed product review information is arranged on a display of the buyer terminal according to the plurality of different shopping malls, and
   wherein the displayed product review information includes the product review, the updated review evaluation, reviewer information of the product review, and a universal resource locator (URL) linking to at least one of a page of the product review of the shopping mall identified by the shopping mall identification information and a page for purchasing the product from the shopping mall identified by the shopping mall identification information.

2. The method of claim 1, wherein:
   the review evaluation is a score; and
   the review evaluation is displayed on the buyer terminal as at least one of a grade, a number, and a star rating.

3. The method of claim 1,
   wherein the product review information extracted from the respective shopping malls further includes at least one of:
   order identification information corresponding to the product review information; and product identification information for identifying the product corresponding to the product review information.

4. The method of claim 1,
wherein the reviewer information includes a hash value based on a user name and user phone number, and
wherein the hash value uniquely identifies a same reviewer using different IDs in the plurality of different shopping malls.

5. The method of claim 1, wherein the product review information further includes a writer evaluation corresponding to the reviewer information.

6. The method of claim 5, further including:
updating the writer evaluation based on the review evaluation input from the buyer terminal; and
storing the updated writer evaluation in a database in association with the reviewer information.

7. A device for evaluating a product review, the device including:
a server that connects to each of a plurality of different shopping malls of varying platforms;
a search box display portion for displaying a search box through which a review of a product is searched by accessing the connected plurality of different shopping malls, respectively, the search box displayed on a buyer terminal;
a search processing portion for
receiving, from the buyer terminal, a keyword that is input via the search box,
extracting product review information as a search result corresponding to the input keyword, the extracted product review information including shopping mall identification information for identifying a shopping mall of the plurality of different shopping malls which sold a product corresponding to the product review information and at least one piece of product review information from each of the plurality of different shopping malls, and
displaying the extracted product review information on the buyer terminal; and
an evaluation processing portion for
inputting, from the buyer terminal, a review evaluation corresponding to the product review,
updating a database of product reviews based on the review evaluation input from the buyer terminal, and
storing the review evaluation in the database in association with the product review,
wherein the database includes a previous review evaluation corresponding to the product review, the previous review evaluation updated when a purchase decision is made in one of the plurality of shopping malls based on the at least one piece of product review information displayed on the buyer terminal,
wherein the product review information is extracted from each of the plurality of different shopping malls and indicates a specific shopping mall for each of the plurality of different shopping malls,
wherein the displayed product review information is arranged on a display of the buyer terminal according to the plurality of different shopping malls, and
wherein the displayed product review information includes the product review, the updated review evaluation, reviewer information of the product review, and a universal resource locator (URL) linking to at least one of a page of the product review of the shopping mall identified by the shopping mall identification information and a page for purchasing the product from the shopping mall identified by the shopping mall identification information.

8. The device of claim 7, wherein:
the review evaluation is a score; and
the review evaluation is displayed on the buyer terminal as at least one of a grade, a number, and a star rating.

9. The device of claim 7,
wherein the product review information extracted from the respective shopping malls further includes at least one of:
order identification information corresponding to the product review information; and
product identification information for identifying the product corresponding to the product review information.

10. The device of claim 7,
wherein the reviewer information includes a hash value based on a user name and user phone number, and
wherein the hash value uniquely identifies a same reviewer using different IDs in the plurality of different shopping malls.

11. The device of claim 7, wherein the product review information further includes a writer evaluation corresponding to the reviewer information.

12. The device of claim 11, wherein the evaluation processing portion updates the writer evaluation based on the review evaluation input from the buyer terminal, and stores the updated writer evaluation in a database in association with the reviewer information.

13. A system for evaluating a product review, the system including:
a buyer terminal; and
a server that connects to each of a plurality of different shopping malls of varying platforms, the server including a control server for
displaying a search box through which a review of a product is searched by accessing the connected plurality of different shopping malls, respectively, the search box displayed on the buyer terminal;
receiving, from the buyer terminal, a keyword that is input via the search box,
extracting product review information as a search result corresponding to the input keyword, the extracted product review information including shopping mall identification information for identifying a shopping mall of the plurality of different shopping malls which sold a product corresponding to the product review information and at least one piece of product review information from each of the plurality of different shopping malls,
displaying the extracted product review information on the buyer terminal,
inputting, from the buyer terminal, a review evaluation corresponding to the product review,
updating a database of product reviews based on the review evaluation input from the buyer terminal, and
storing the review evaluation in the database in association with the product review,
wherein the database includes a previous review evaluation corresponding to the product review, the previous review evaluation updated when a purchase decision is made in one of the plurality of shopping malls based on the at least one piece of product review information displayed on the buyer terminal,
wherein the product review information is extracted from each of the plurality of different shopping malls and indicates a specific shopping mall for each of the plurality of different shopping malls, wherein the displayed product review information is arranged on a display of the buyer terminal according to the plurality of different shopping malls, and wherein the displayed product review information includes the product review, the updated review evaluation, reviewer information of the product review, and a universal resource locator (URL) linking to at least one of a page of the product review of the shopping mall identified by the shopping mall identification information and a page for purchasing the product from the shopping mall identified by the shopping mall identification information.

14. The system of claim 13, wherein:

the review evaluation is a score; and the review evaluation is displayed on the buyer terminal as at least one of a grade, a number, and a star rating.

15. The system of claim 13, wherein the product review information extracted from the respective shopping malls further includes at least one of:

order identification information corresponding to the product review information; and product identification information for identifying the product corresponding to the product review information.

16. The system of claim 13, wherein the reviewer information includes a hash value based on a user name and user phone number, and wherein the hash value uniquely identifies a same reviewer using different IDs in the plurality of different shopping malls.

17. The system of claim 13, wherein the product review information further includes a writer evaluation corresponding to the reviewer information.

18. The system of claim 17, wherein the control server updates the writer evaluation based on the review evaluation input from the buyer terminal, and stores the updated writer evaluation in a database in association with the reviewer information.

* * * * *